(12) United States Patent
Santo et al.

(10) Patent No.: US 10,195,886 B2
(45) Date of Patent: Feb. 5, 2019

(54) THERMAL TRANSFER RECORDING SHEET SET AND IMAGE FORMING METHOD

(71) Applicant: CANON KABUSHIKI KAISHA, Tokyo (JP)

(72) Inventors: Tsuyoshi Santo, Yokohama (JP); Yuko Katsumoto, Yokohama (JP); Koromo Shirota, Kawasaki (JP); Taichi Shintou, Saitama (JP); Hajime Muta, Zama (JP); Tomoyuki Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/820,124

(22) Filed: Nov. 21, 2017

(65) Prior Publication Data

US 2018/0147875 A1    May 31, 2018

(30) Foreign Application Priority Data

Nov. 29, 2016 (JP) ................. 2016-231527

(51) Int. Cl.
| | |
|---|---|
| *B41M 5/34* | (2006.01) |
| *B41M 5/40* | (2006.01) |
| *C09D 11/037* | (2014.01) |
| *B41M 5/382* | (2006.01) |
| *B41M 5/385* | (2006.01) |
| *B41M 5/388* | (2006.01) |
| *B41M 5/39* | (2006.01) |
| *B41M 5/52* | (2006.01) |

(52) U.S. Cl.
CPC ............ *B41M 5/345* (2013.01); *B41M 5/385* (2013.01); *B41M 5/388* (2013.01); *B41M 5/3852* (2013.01); *B41M 5/3854* (2013.01); *B41M 5/3856* (2013.01); *B41M 5/3858* (2013.01); *B41M 5/38228* (2013.01); *B41M 5/39* (2013.01); *B41M 5/40* (2013.01); *B41M 5/5227* (2013.01); *C09D 11/037* (2013.01); *B41M 2205/02* (2013.01); *B41M 2205/32* (2013.01)

(58) Field of Classification Search
CPC .. B41F 16/00; B41F 16/0006; B41F 16/0026; B41F 16/0033; B41J 31/00; B41J 2/315; B41J 2/32; B41J 2/325; B41M 5/345; B41M 5/388; B41M 5/39; B41M 5/385; B41M 5/3852; B41M 5/5227
See application file for complete search history.

(56) References Cited

U.S. PATENT DOCUMENTS

| | | | |
|---|---|---|---|
| 3,251,881 A | 5/1966 | Susi | |
| 3,484,467 A | 12/1969 | Susi | |
| 2009/0081420 A1* | 3/2009 | Tojo | ............... C09D 11/101 428/195.1 |
| 2009/0220877 A1* | 9/2009 | Kakino | ............... G03G 8/00 430/66 |
| 2010/0080925 A1* | 4/2010 | Araki | ............... C09D 11/101 427/511 |

FOREIGN PATENT DOCUMENTS

| | | |
|---|---|---|
| JP | 61-69991 A | 4/1986 |
| JP | 7-156562 A | 6/1995 |
| JP | 2001-158879 A | 6/2001 |

* cited by examiner

*Primary Examiner* — Kristal Feggins
(74) *Attorney, Agent, or Firm* — Canon U.S.A. Inc., IP Division

(57) ABSTRACT

A thermal transfer recording sheet set includes an image-receiving sheet that includes an image-receiving layer containing a compound represented by general formula (1) or (2) and an ink sheet that includes a yellow coloring material layer containing a particular dye and a cyan coloring material layer containing a particular dye.

7 Claims, No Drawings

THERMAL TRANSFER RECORDING SHEET SET AND IMAGE FORMING METHOD

BACKGROUND OF THE INVENTION

Field of the Invention

The present disclosure relates to a thermal transfer recording sheet set including a thermal transfer recording ink sheet and a thermal transfer image-receiving sheet.

Description of the Related Art

With the recent spread of portable color display devices, there has been an increasing demand for simply printing, in color, photographs and documents that are captured or prepared using such devices. Examples of the color printing method include electrophotography, ink jet printing, and thermal transfer recording. In particular, thermal transfer recording can be performed in a dry process using a small portable printer. Therefore, thermal transfer recording is suitable for performing printing in a simple manner without being affected by an ambient environment. Furthermore, since dyes are used as coloring materials, the density of images can be expressed by changing the density level of coloring materials. Thus, good clarity of images and high color reproducibility are achieved.

Thermal transfer recording is an image forming method in which by heating a thermal transfer recording ink sheet including a coloring material layer containing a thermally migratable coloring material while the thermal transfer recording ink sheet is placed on a thermal transfer image-receiving sheet having a surface on which a coloring material image-receiving layer is disposed, the coloring material supported on the ink sheet is transferred onto the image-receiving sheet.

In thermal transfer recording, to improve the light resistance of printed matter, there have been a proposal (Japanese Patent Laid-Open No. 2001-158879) of using an anti-fading agent on a thermal transfer recording sheet and/or an image-receiving sheet and a proposal (Japanese Patent Laid-Open No. 7-156562) of using a singlet oxygen quencher on a thermal transfer recording sheet and/or an image-receiving sheet.

SUMMARY OF THE INVENTION

In thermal transfer recording, catalytic fading is known to occur between dyes when colors are mixed because recording is performed by superimposing yellow, magenta, and cyan. Therefore, even if dyes having high light resistance when used alone are used, a difference in light resistance is made between colors when the dyes are mixed. For example, there is a problem in that only cyan is faded in a black image, resulting in a reddish or yellowish black image. Such a difference in the degree of fading between colors in an image is referred to as an "imbalance". The case where all colors are faded to the same degree refers to "good imbalance". The case where only a particular color is more quickly faded than the other colors refers to "poor imbalance". In a publicly known image forming method that uses thermal transfer recording, there is still a room for improvement in imbalance.

Accordingly, the present disclosure provides a thermal transfer recording sheet set which includes a thermal transfer recording ink sheet and a thermal transfer image-receiving sheet and with which an image with good imbalance is formed.

The present disclosure relates to a thermal transfer recording sheet set including an ink sheet and an image-receiving sheet. The image-receiving sheet is a thermal transfer image-receiving sheet including an image-receiving layer containing at least one compound selected from the group consisting of compounds represented by general formulae (1) and (2) below, the image-receiving layer being disposed on a substrate. The ink sheet is a thermal transfer recording ink sheet including a coloring material layer containing a yellow dye, a coloring material layer containing a magenta dye, and a coloring material layer containing a cyan dye, the coloring material layers being disposed on a substrate. The yellow dye contains at least one compound selected from the group consisting of compounds represented by general formulae (3) to (6) below. The cyan dye contains at least one compound selected from the group consisting of compounds represented by general formulae (7) to (9) below.

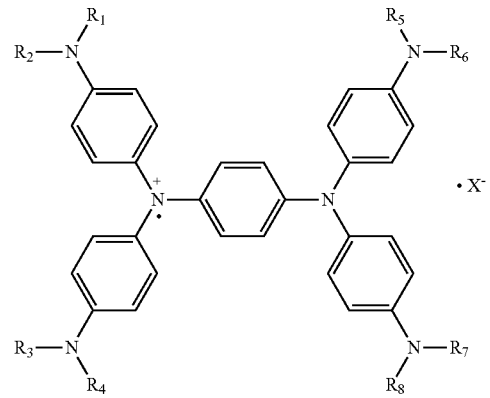

General formula (1)

In the general formula (1), $R_1$ to $R_8$ each independently represent an alkyl group that has 3 to 8 carbon atoms and optionally has a substituent, an alkenyl group that optionally has a substituent, an aralkyl group that optionally has a substituent, an alkynyl group that optionally has a substituent, or an aryl group that optionally has a substituent; $R_1$ and $R_2$, $R_3$ and $R_4$, $R_5$ and $R_6$, and $R_7$ and $R_8$ each optionally bond to each other so as to form a ring; and $X^-$ represents an anion.

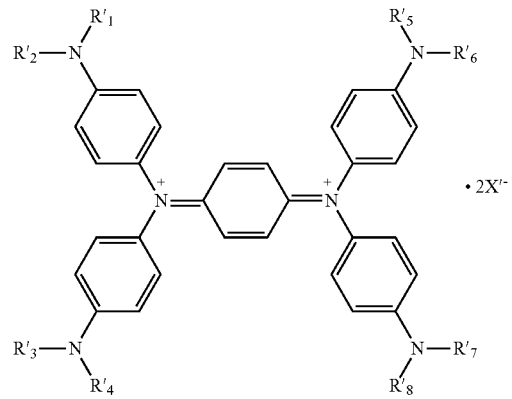

General formula (2)

In the general formula (2), $R'_1$ to $R'_8$ each independently represent an alkyl group that has 3 to 8 carbon atoms and optionally has a substituent, an alkenyl group that optionally has a substituent, an aralkyl group that optionally has a substituent, an alkynyl group that optionally has a substituent, or an aryl group that optionally has a substituent; $R'_1$ and $R'_2$, $R'_3$ and $R'_4$, $R'_5$ and $R'_6$, and $R'_7$ and $R'_8$ each optionally bond to each other so as to form a ring; and $X'^-$ represents an anion.

General formula (3)

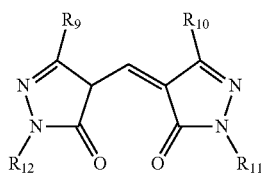

In the general formula (3), $R_9$ to $R_{12}$ each independently represent an alkyl group or an aryl group that optionally has a substituent.

General formula (4)

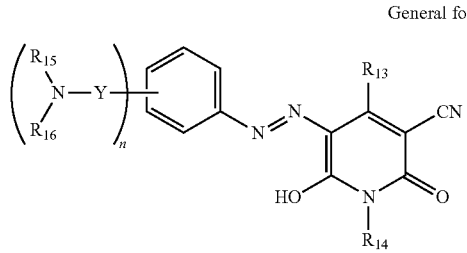

In the general formula (4), $R_{13}$ represents an alkyl group, an aryl group that optionally has a substituent, or an amino group that optionally has a substituent; $R_{14}$ represents a hydrogen atom, an alkyl group, an aryl group that optionally has a substituent, or —N(—$R_a$)$R_b$, where $R_a$ and $R_b$ each independently represent a hydrogen atom, an alkyl group, or an acyl group, and $R_a$ and $R_b$ optionally bond to each other so as to form a ring; $R_{15}$ represents an alkyl group; $R_{16}$ represents a hydrogen atom or an alkyl group; Y represents a carbonyl group or a sulfonyl group; and n represents an integer of 1 to 3.

General formula (5)

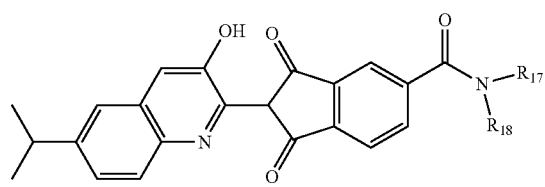

In the general formula (5), $R_{17}$ and $R_{18}$ each independently represent an alkyl group or an aryl group.

General formula (6)

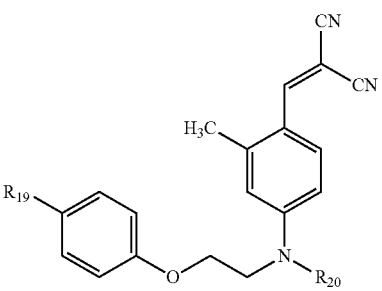

In the general formula (6), $R_{19}$ and $R_{20}$ each independently represent an alkyl group or an aryl group.

General formula (7)

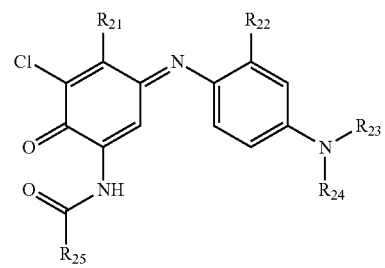

In the general formula (7), $R_{21}$ to $R_{25}$ each independently represent an alkyl group or an aryl group.

General formula (8)

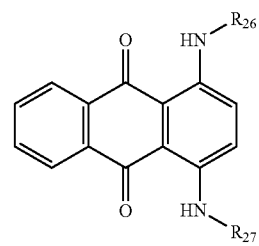

In the general formula (8), $R_{26}$ and $R_{27}$ each independently represent an alkyl group or an aryl group that optionally has a substituent.

General formula (9)

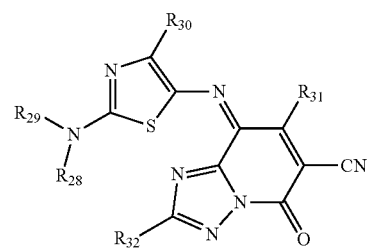

In the general formula (9), $R_{28}$ to $R_{32}$ each independently represent an alkyl group or an aryl group.

Further features of the present disclosure will become apparent from the following description of exemplary embodiments.

DESCRIPTION OF THE EMBODIMENTS

Hereafter, the present disclosure will be further described in detail.

As a result of thorough studies conducted by the present inventors to address the above problems, they have found the following. That is, an image having good imbalance can be formed by using, in a combined manner, a thermal transfer image-receiving sheet including an image-receiving layer containing at least one compound selected from the group consisting of compounds represented by general formulae (1) and (2) described later, the image-receiving layer being disposed on a substrate and a thermal transfer recording ink sheet including a coloring material layer containing a yellow dye containing at least one compound selected from the group consisting of compounds represented by general formulae (3) to (6) described later, a coloring material layer containing a magenta dye, and a coloring material layer containing a cyan dye containing at least one compound selected from the group consisting of compounds represented by general formulae (7) to (9) described later, the coloring material layers being disposed on a substrate.

Thermal Transfer Recording Sheet Set

A thermal transfer recording sheet set includes an ink sheet and an image-receiving sheet, and the forms thereof are not particularly limited. For example, by heating the ink sheet while the ink sheet and the image-receiving sheet are placed on top of each other, a coloring material in the ink sheet is transferred onto the image-receiving sheet to form an image on the image-receiving sheet.

Compound Contained in Image-Receiving Layer Supported on Image-Receiving Sheet

The compound contained in the image-receiving layer formed on the substrate of the image-receiving sheet will be described.

The image-receiving layer contains a compound represented by general formula (1) below or general formula (2) below.

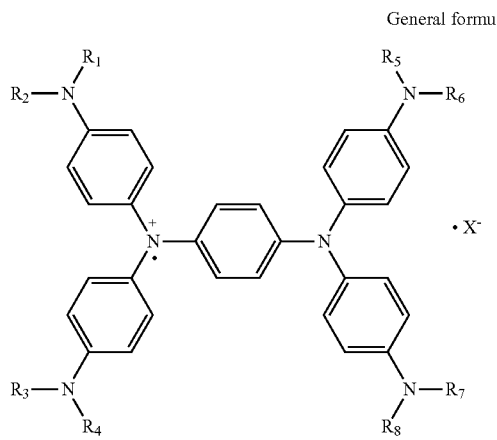

General formula (1)

In the general formula (1), $R_1$ to $R_8$ each independently represent an alkyl group that has 3 to 8 carbon atoms and optionally has a substituent, an alkenyl group that optionally has a substituent, an aralkyl group that optionally has a substituent, an alkynyl group that optionally has a substituent, or an aryl group that optionally has a substituent; $R_1$ and $R_2$, $R_3$ and $R_4$, $R_5$ and $R_6$, and $R_7$ and $R_8$ each optionally bond to each other so as to form a ring; and $X^-$ represents an anion.

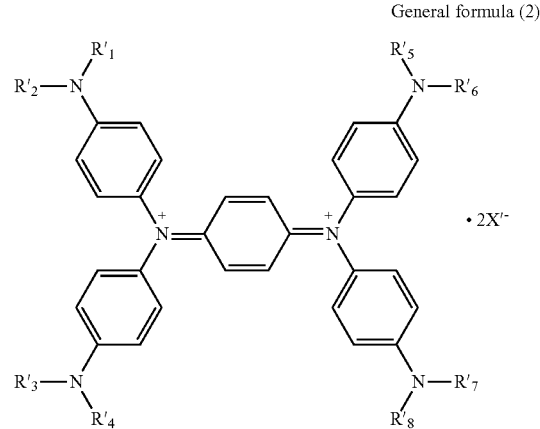

General formula (2)

In the general formula (2), $R'_1$ to $R'_8$ each independently represent an alkyl group that has 3 to 8 carbon atoms and optionally has a substituent, an alkenyl group that optionally has a substituent, an aralkyl group that optionally has a substituent, an alkynyl group that optionally has a substituent, or an aryl group that optionally has a substituent; $R'_1$ and $R'_2$, $R'_3$ and $R'_4$, $R'_5$ and $R'_6$, and $R'_7$ and $R'_8$ each optionally bond to each other so as to form a ring; and $X'^-$ represents an anion.

In the general formula (1) or the general formula (2), the alkyl group that has 3 to 8 carbon atoms, optionally has a substituent, and is represented by $R_1$ to $R_8$ or $R'_1$ to $R'_8$ is not particularly limited as long as the total number of carbon atoms (including the number of carbon atoms of the substituent) is 3 to 8 and may be a linear, branched, or cyclic alkyl group. Examples of the substituent include an alkoxy group and a cyano (nitrile) group (—CN). Specific examples of the alkyl group include a n-propyl group, an iso-propyl group, a n-butyl group, a sec-butyl group, a tert-butyl group, an iso-butyl group, an octyl group, a cyclobutyl group, a cyclopentyl group, a cyclohexyl group, a methylcyclohexyl group, a 2-ethylpropyl group, a 2-ethylhexyl group, a methoxypropyl group, and a cyanopropyl group. Among them, a n-propyl group, an iso-propyl group, a n-butyl group, and a sec-butyl group are particularly used because an image with improved imbalance is formed.

In the general formula (1) or the general formula (2), the alkenyl group that optionally has a substituent and is represented by $R_1$ to $R_8$ or $R'_1$ to $R'_8$ is not particularly limited. Examples of the substituent include a hydroxy group (—OH) and a carboxy group (—COOH). The total number of carbon atoms of the alkenyl group (including the number of carbon atoms of the substituent) is, for example, 2 to 8.

Specific Examples of the alkenyl group that optionally has a substituent include a vinyl group, a propenyl group, a butenyl group, a pentenyl group, a hexenyl group, a heptenyl group, an octenyl group, a 2-hydroxyvinyl group, a 3-hydroxypropenyl group, and a 3-carboxypropenyl group.

In the general formula (1) or the general formula (2), the aralkyl group that optionally has a substituent and is represented by $R_1$ to $R_8$ or $R'_1$ to $R'_8$ is not particularly limited. Examples of the substituent include alkyl groups and halogen atoms (e.g., chloro group and fluoro group). The total number of carbon atoms of the aralkyl group (including the number of carbon atoms of the substituent) may be, for example, 7 to 12.

Specific examples of the aralkyl group that optionally has a substituent include a benzyl group, a p-chlorobenzyl group, a p-methylbenzyl group, a phenethyl group (2-phenylethyl group), a 3-phenylpropyl group, an α-naphthylmethyl group, and a β-naphthylethyl group.

In the general formula (1) or the general formula (2), the alkynyl group that optionally has a substituent and is represented by $R_1$ to $R_8$ or $R'_1$ to $R'_8$ is not particularly limited. Examples of the substituent include a hydroxy group, a carboxy group, and halogen atoms (e.g., chloro group and fluoro group). The total number of carbon atoms of the alkynyl group (including the number of carbon atoms of the substituent) may be, for example, 3 to 6.

Specific examples of the alkynyl group that optionally has a substituent include a propargyl group, a butynyl group, a pentynyl group, a hexynyl group, a 2-hydroxybutynyl group, a 2-carboxypentynyl group, and a 2-chlorobutynyl group.

In the general formula (1) or the general formula (2), the aryl group that optionally has a substituent and is represented by $R_1$ to $R_8$ or $R'_1$ to $R'_8$ is not particularly limited. Examples of the substituent include alkyl groups and alkoxy groups. The total number of carbon atoms of the aryl group (including the number of carbon atoms of the substituent) may be, for example, 6 to 12.

Specific Examples of the aryl group that optionally has a substituent include a phenyl group, a tolyl group (e.g., 2-methylphenyl group), a 3-propylphenyl group, a xylyl group (e.g., 2,6-dimethylphenyl group), a naphthyl group, an α-methylnaphthyl group, and a β-ethylnaphthyl group.

Furthermore, in the general formula (1), $R_1$ and $R_2$, $R_3$ and $R_4$, $R_5$ and $R_6$, and $R_7$ and $R_8$ each optionally bond to each other so as to form a ring. More specifically, a cyclic structure including each combination (e.g., $R_1$ and $R_2$) and a nitrogen atom (N atom) that bonds to the combination (e.g., $R_1$ and $R_2$) may be formed. Examples of the ring include a five-membered ring that optionally has a substituent, a six-membered ring that optionally has a substituent, and a seven-membered ring that optionally has a substituent. Specifically, for example, the five-membered ring is a pyrrolidine ring, the six-membered ring is a piperidine ring, a morpholine ring, or a piperazine ring, and the seven-membered ring is an azepane ring.

Similarly, also in the general formula (2), $R'_1$ and $R'_2$, $R'_3$ and $R'_4$, $R'_5$ and $R'_6$, and $R'_7$ and $R'_8$ each optionally bond to each other so as to form a ring. More specifically, a cyclic structure including each combination (e.g., $R'_1$ and $R'_2$) and a nitrogen atom (N atom) that bonds to the combination (e.g., $R'_1$ and $R'_2$) may be formed. The cyclic structure including each combination and a nitrogen atom is not particularly limited and is, for example, the same cyclic structure as in the general formula (1).

$R_1$ and $R_2$, $R_3$ and $R_4$, $R_5$ and $R_6$, and $R_7$ and $R_8$ in the general formula (1) each desirably represent the same substituent. Similarly, $R'_1$ and $R'_2$, $R'_3$ and $R'_4$, $R'_5$ and $R'_6$, and $R'_7$ and $R'_8$ in the general formula (2) each desirably represent the same substituent. When they represent the same substituent, an image with improved imbalance tends to be formed.

$R_1$ to $R_8$ and $R'_1$ to $R'_8$ in the general formulae (1) and (2) preferably each independently represent an alkyl group that has 3 to 8 carbon atoms and that optionally has a substituent because an image with further improved imbalance tends to be formed. In particular, an unsubstituted alkyl group or a cyanoalkyl group is more preferably used.

In the general formula (1) or the general formula (2), the anion represented by $X^-$ or $X'^-$ is not particularly limited. Specific examples of the anion include a fluoride ion, a chloride ion, a bromide ion, an iodide ion, a perchlorate ion ($ClO_4^-$), a nitrate ion, a methanesulfonate ion, a benzenesulfonate ion, a p-toluenesulfonate ion, a p-trifluoromethylbenzenesulfonate ion, a 2,3,4,5,6-pentafluorobenzenesulfonate ion, a methylsulfate ion, an ethylsulfate ion, a propylsulfate ion, a tetrafluoroborate ion ($BF_4^-$), a tetraphenylborate ion, a hexafluorophosphate ion ($PF_6^-$), a benzenesulfinate ion, an acetate ion, a trifluoroacetate ion, a propionacetate ion, a benzoate ion, an oxalate ion, a succinate ion, a malonate ion, an oleate ion, a stearate ion, a citrate ion, a picolinate ion, a hydrogenphosphate ion, a dihydrogenphosphate ion, a pentafluoropropionate ion, a chlorosulfonate ion, a fluorosulfonate ion, a trifluoromethanesulfonate ion, a hexafluoroarsenate ion, a hexafluoroantimonate ion ($SbF_6^-$), a molybdate ion, a tungstate ion, a titanate ion, a zirconate ion, a naphthalenedisulfonate ion, a tris(trifluoromethanesulfonyl)methide ion ($C(SO_2CF_3)_3^-$), a bis(trifluoromethanesulfonyl)imide ion ($N(SO_2CF_3)_2^-$), a pentafluorophenylbis(trifluoromethanesulfonyl)methide ion, a bis(perfluoroethanesulfonyl)imide ion ($N(SO_2CF_2CF_3)_2^-$), and a tetrakis(pentafluorophenyl)borate ion.

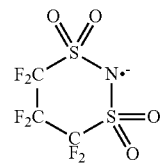

The compound represented by the general formula (1) or (2) can be synthesized by a publicly known method described in U.S. Pat. No. 3,251,881, U.S. Pat. No. 3,484,467, or Japanese Patent Laid-Open No. 61-69991. For example, the compound can be produced through the following process. That is, an amino form obtained through an Ullmann reaction and a reduction reaction is selectively subjected to substitution by performing alkylation, alkenylation, aralkylation, alkynylation, or the like and then a silver salt oxidation reaction, an electrolytic oxidation reaction, or the like is performed. To produce a compound in which $R_1$ to $R_8$ are asymmetric or $R'_1$ to $R'_8$ are asymmetric (e.g., a compound in which $R_1$ and $R_2$ are different from $R_5$ and $R_6$ in the general formula (1)), the compound may be synthesized by performing alkylation or the like in a multistep manner.

The compound represented by the general formula (1) or (2) has a maximum absorption wavelength in the near-infrared range of 900 to 1,400 nm and also has a large peak with a molar absorption coefficient of about several tens of thousand to about several hundred thousands. The compound also exhibits small absorption in the visible range. Therefore, even if the compound is added to the image-receiving sheet, the color change and fading of the coloring agent are unlikely to occur.

The compound represented by the general formula (1) or (2) is not limited to a single compound, and two or more compounds may be appropriately combined with each other.

Non-limiting examples of the compound represented by the general formula (1) or (2) include compounds (1) to (29) and compounds (122) to (132) below.

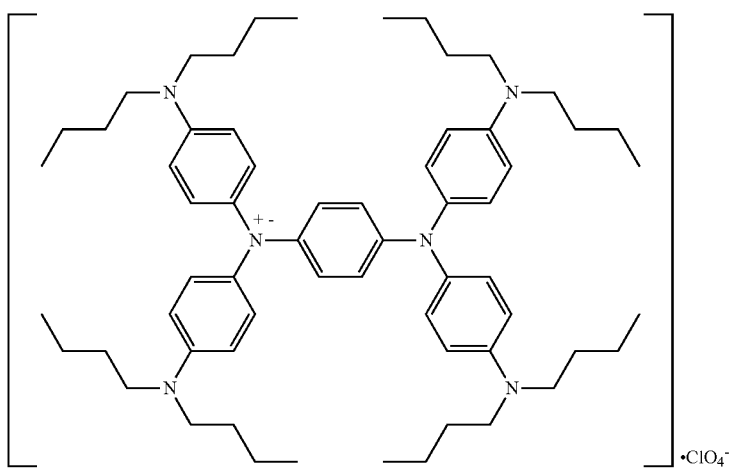
Compound (1)
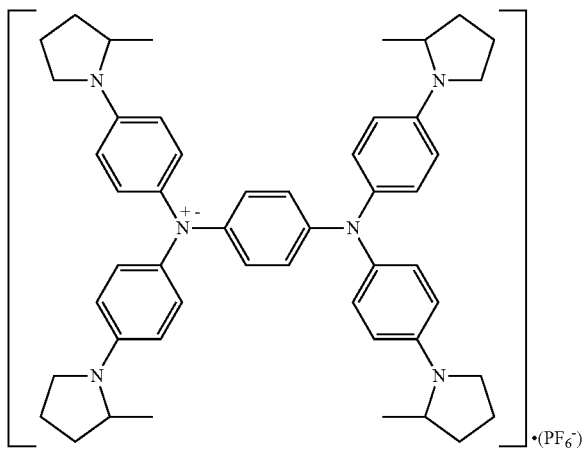
Compound (2)
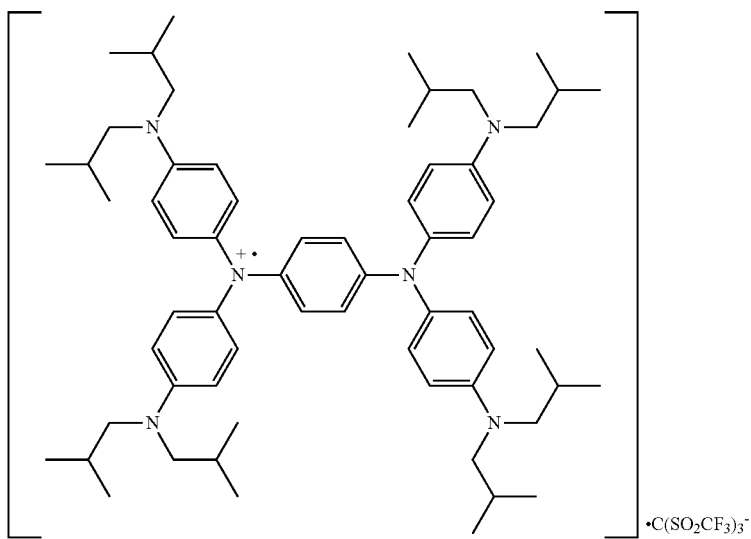
Compound (3)

Compound (4)
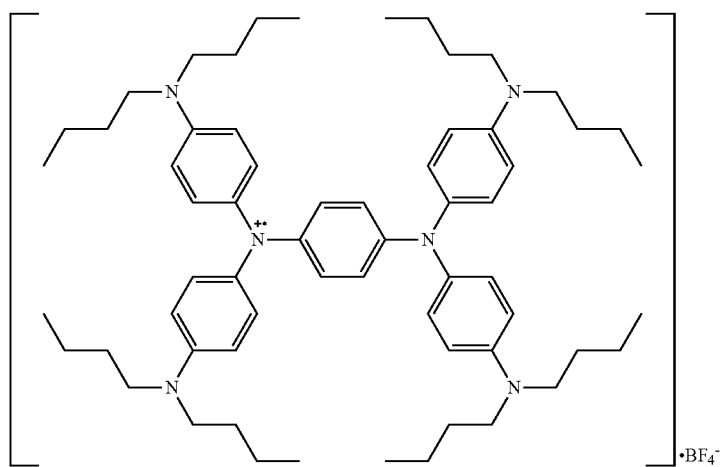
Compound (5)
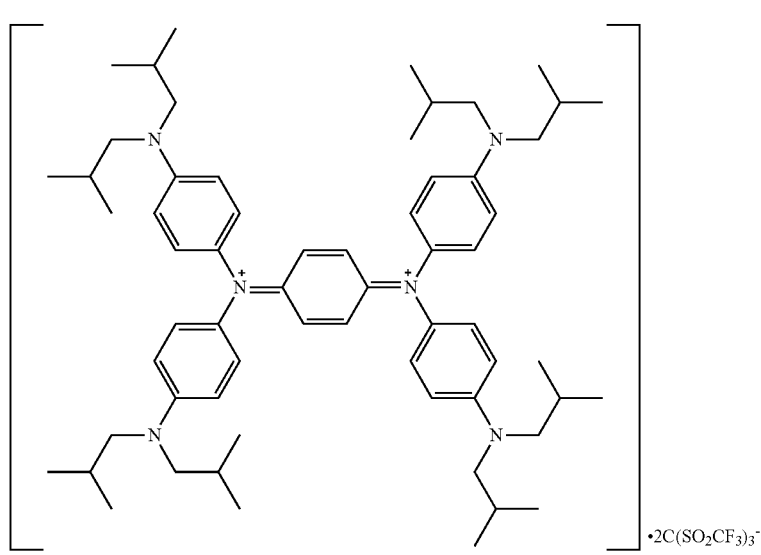
Compound (6)
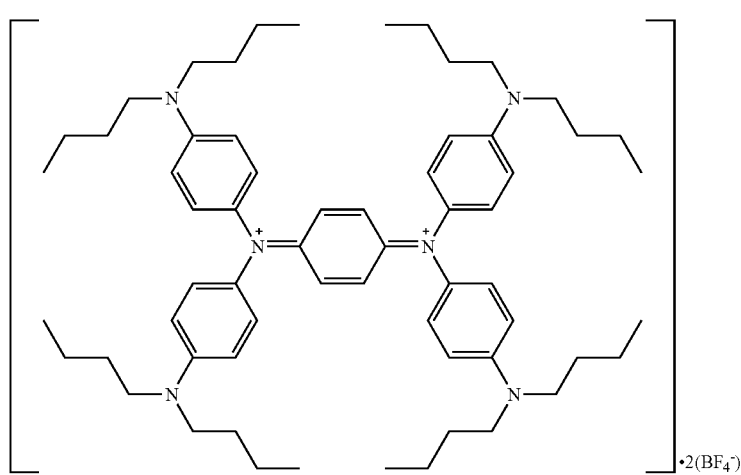

-continued
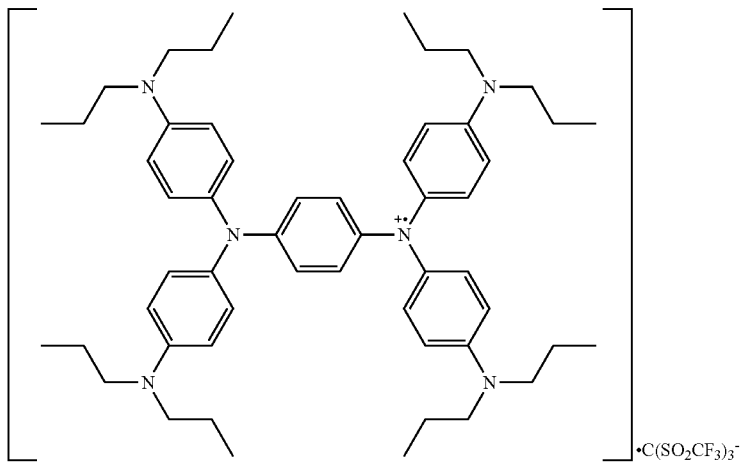
Compound (7)
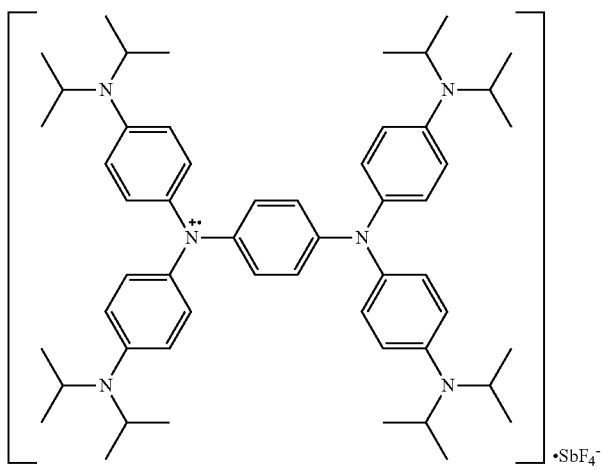
Compound (8)
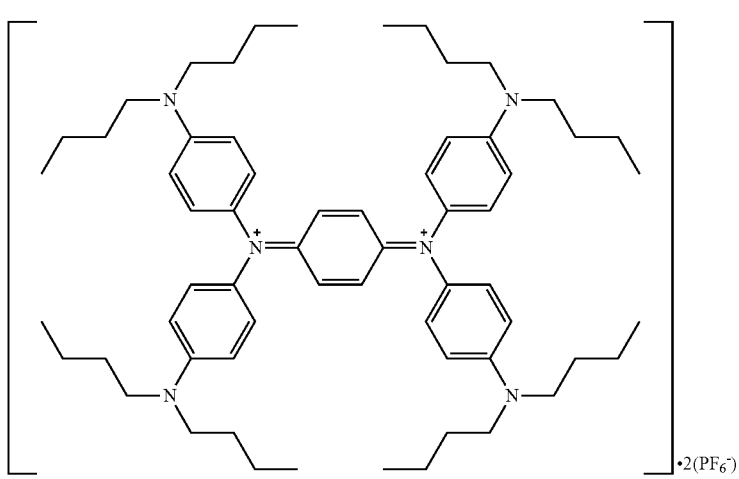
Compound (9)

Compound (10)
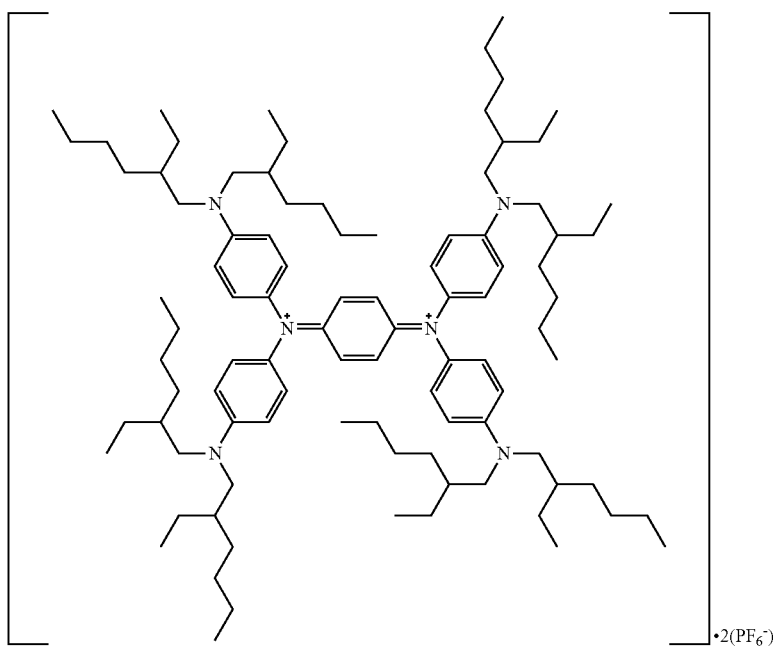
Compound (11)
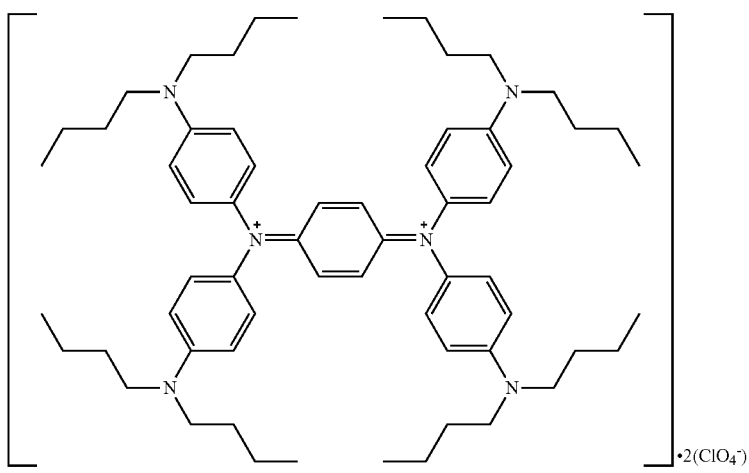
Compound (12)
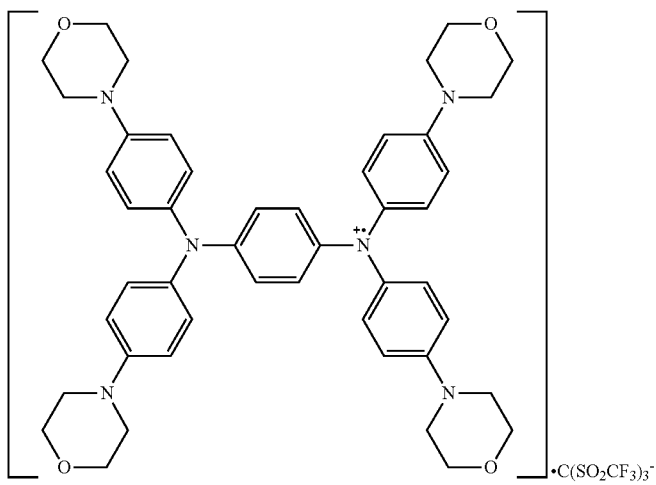

-continued
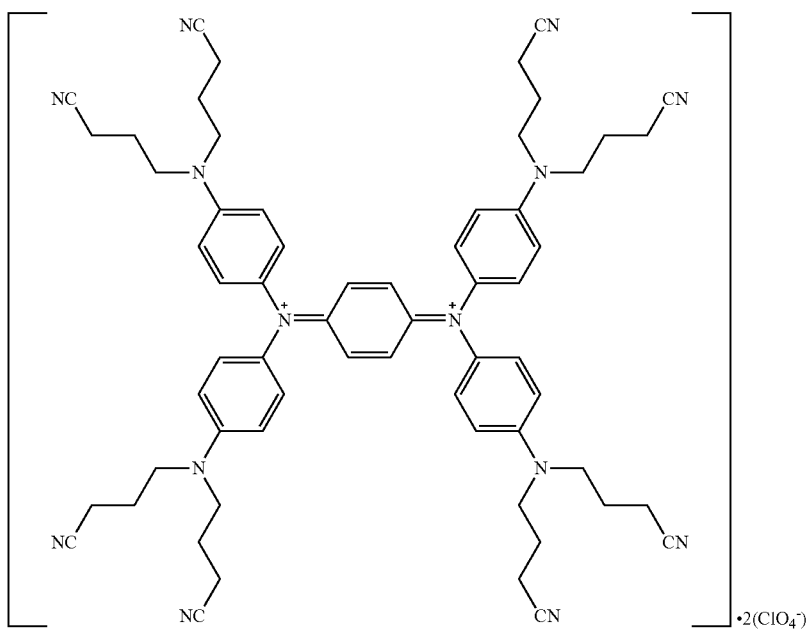
Compound (13)
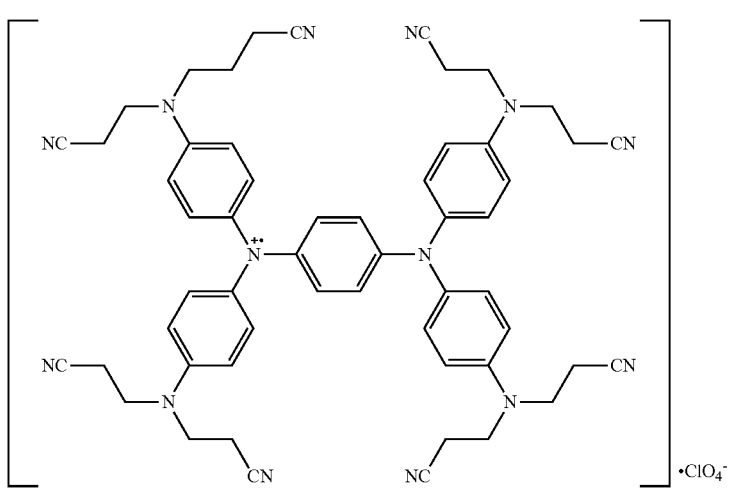
Compound (14)
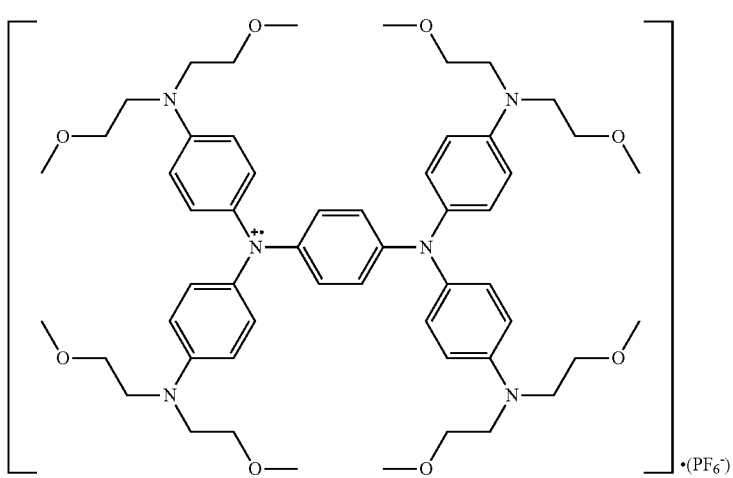
Compound (15)

-continued
Compound (16)
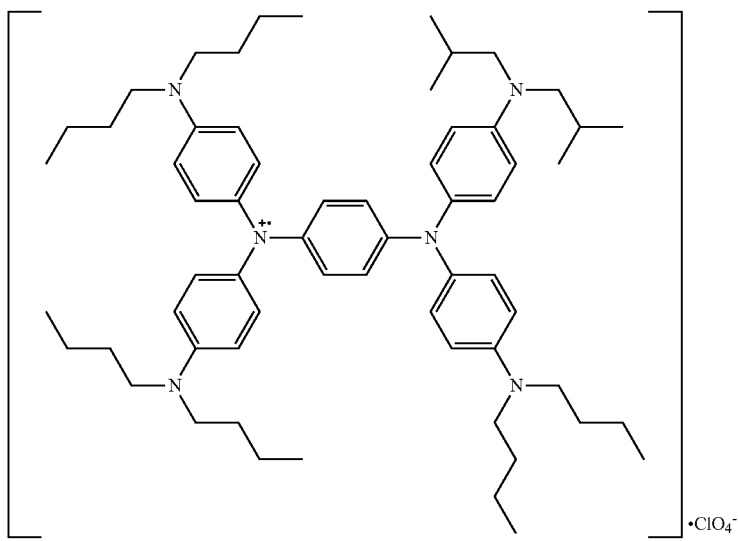
Compound (17)
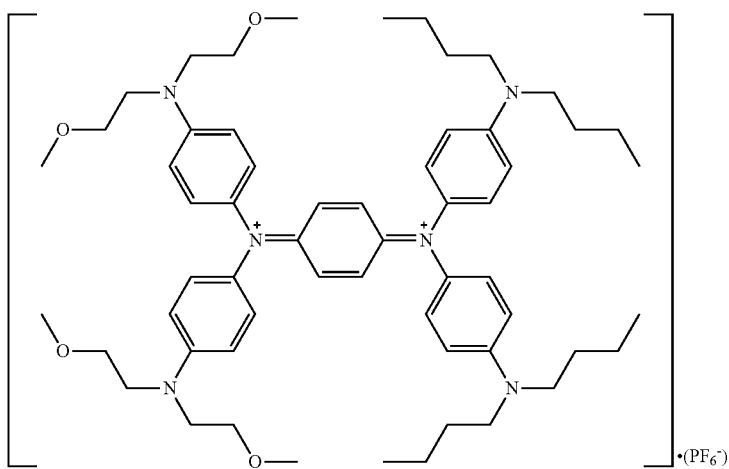
Compound (18)
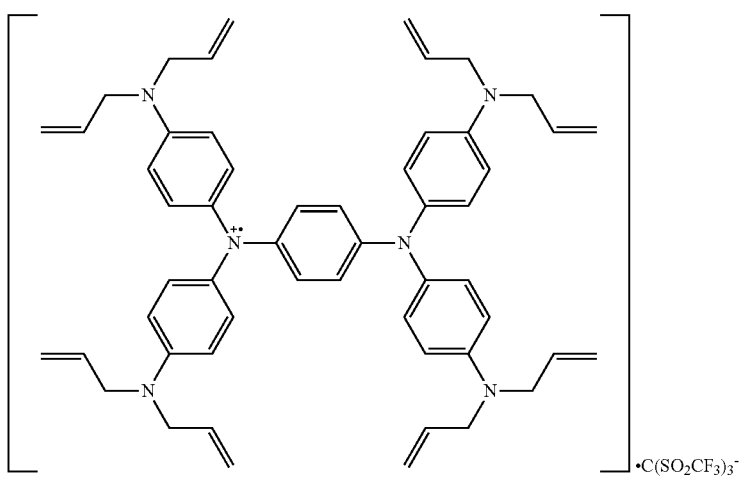

-continued
Compound (19)
Compound (20)
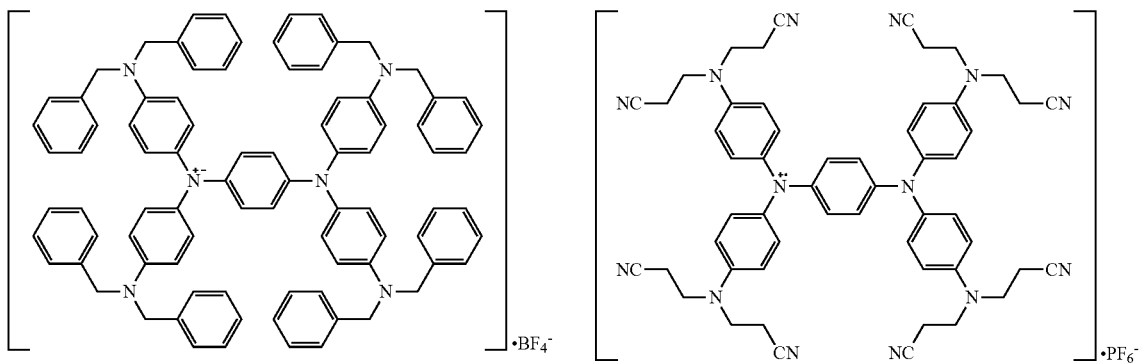
Compound (21)
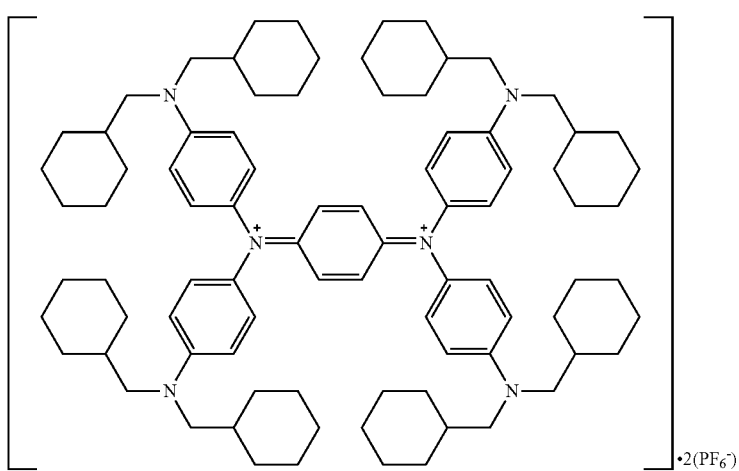
Compound (22)
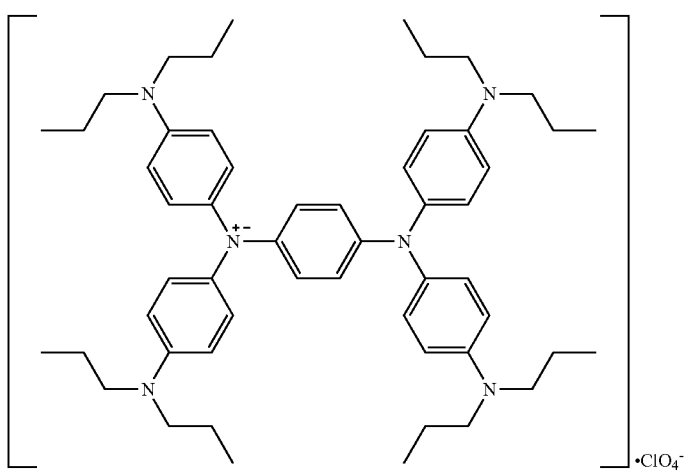

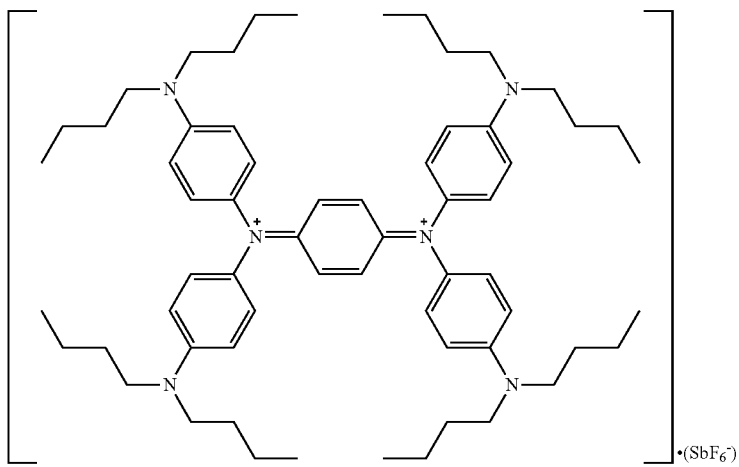
Compound (23)
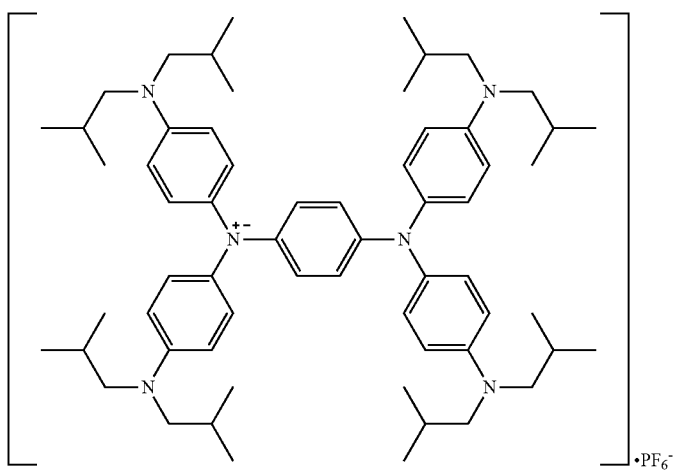
Compound (24)
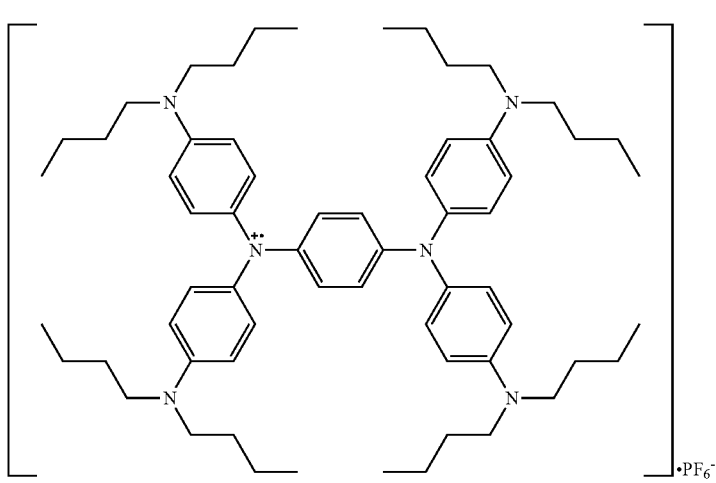
Compound (25)

-continued
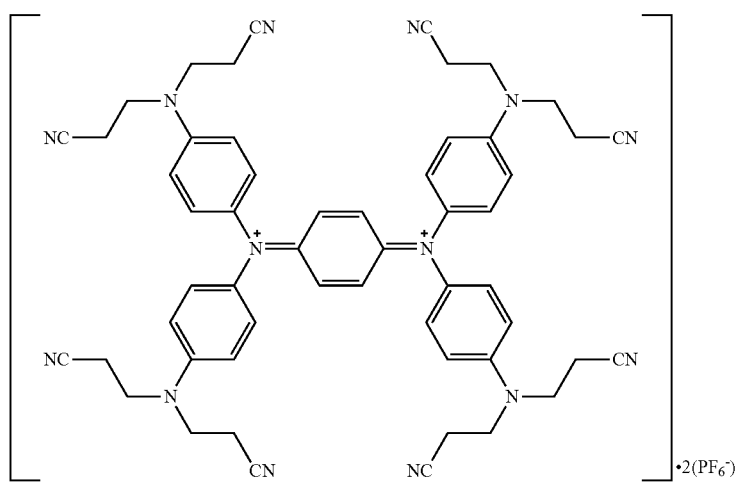
Compound (26)
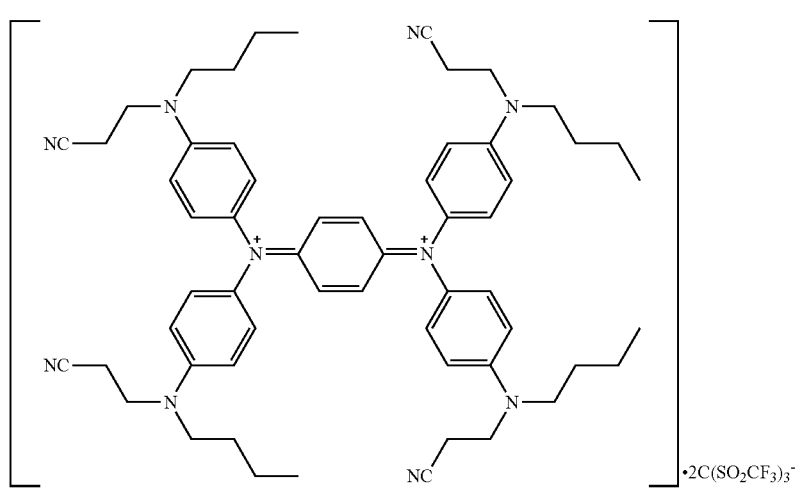
Compound (27)
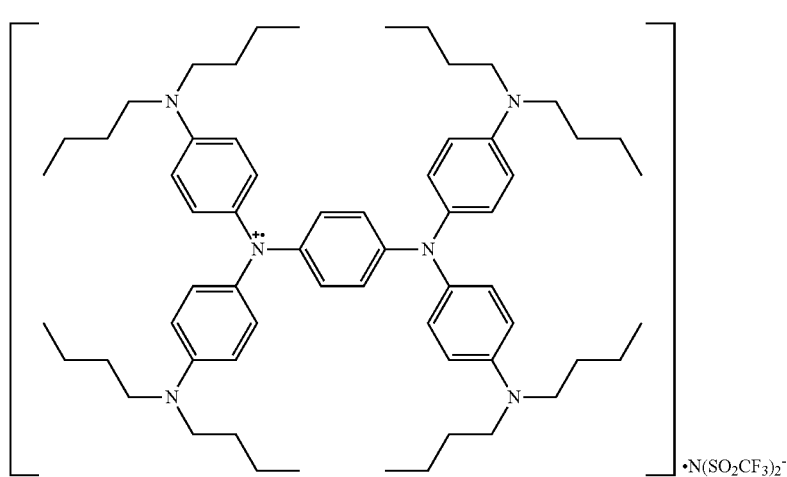
Compound (28)

-continued
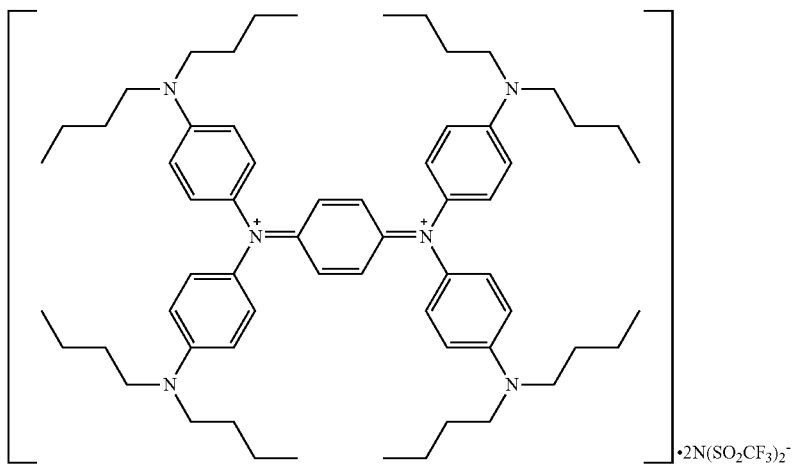
Compound (29)
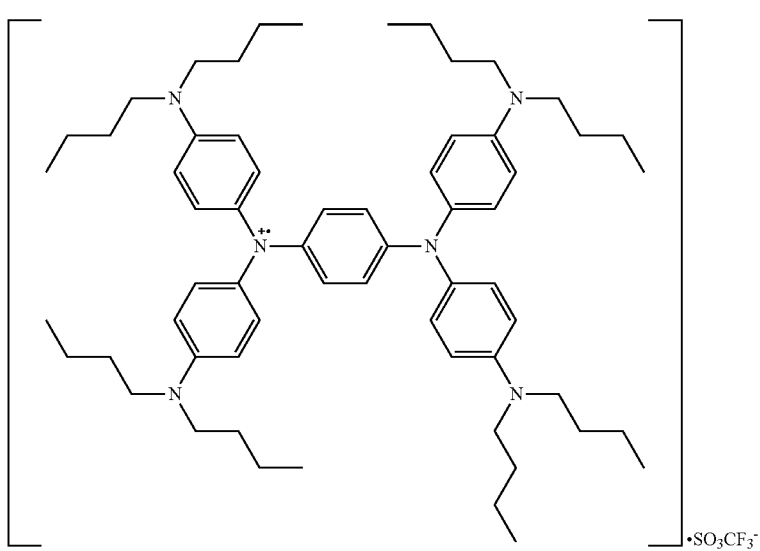
Compound (122)
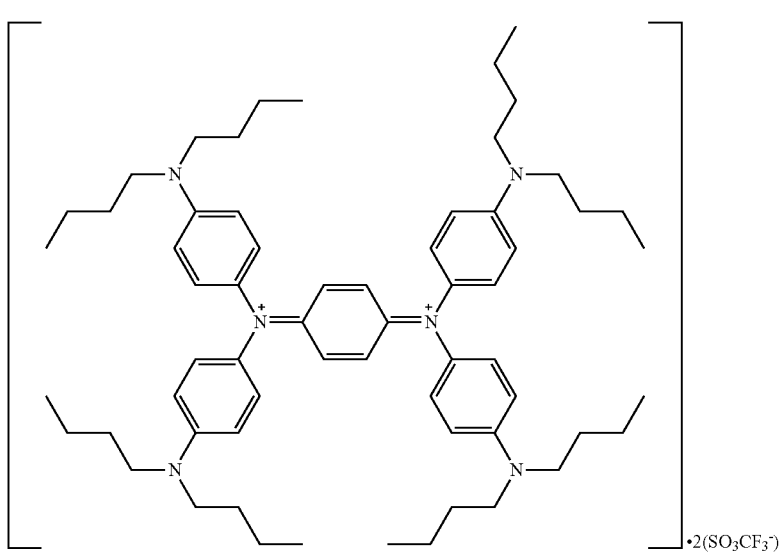
Compound (123)

-continued
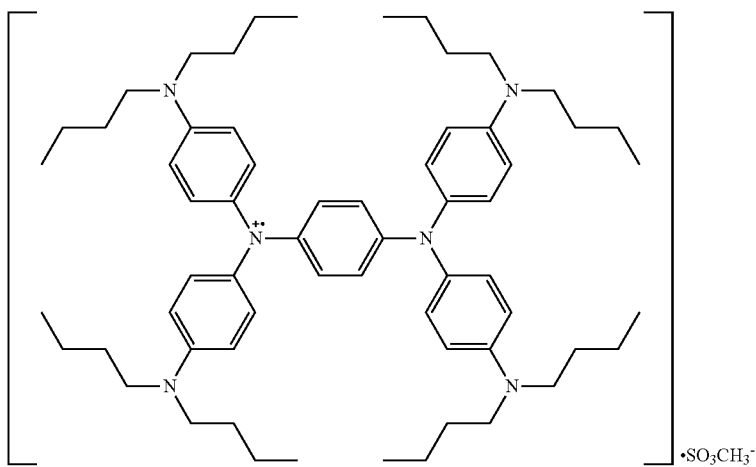
Compound (124)
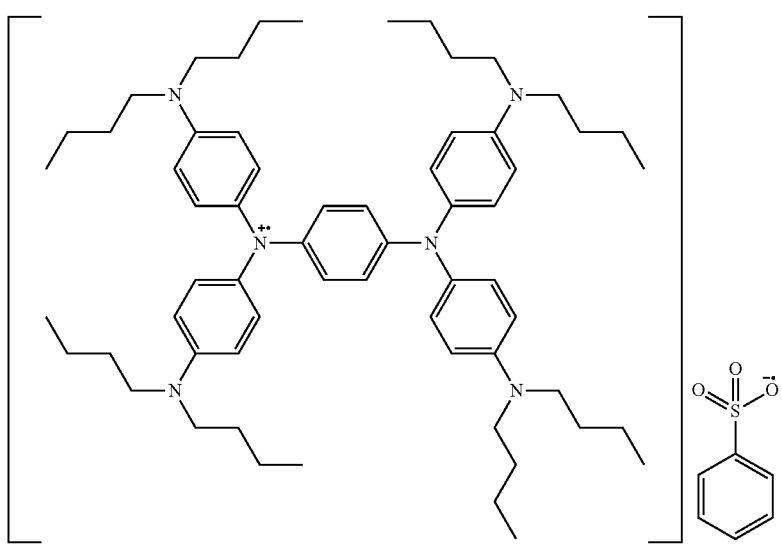
Compound (125)
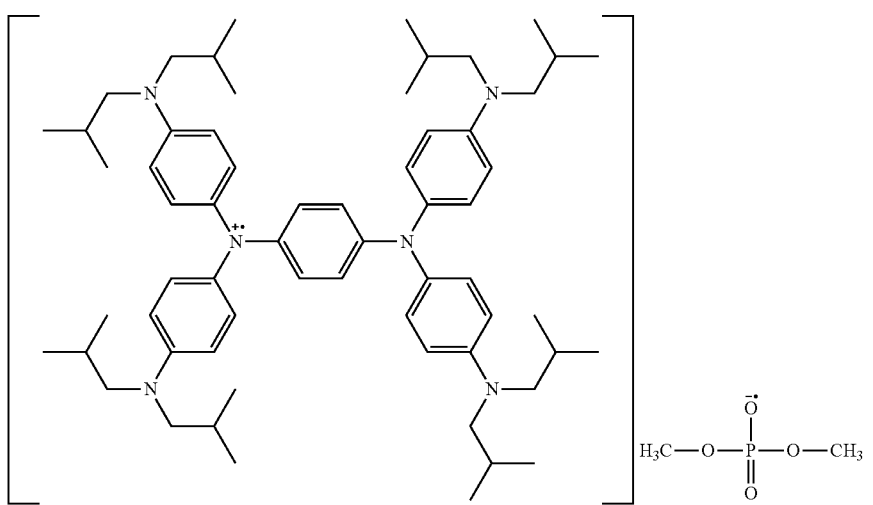
Compound (126)

Compound (127)
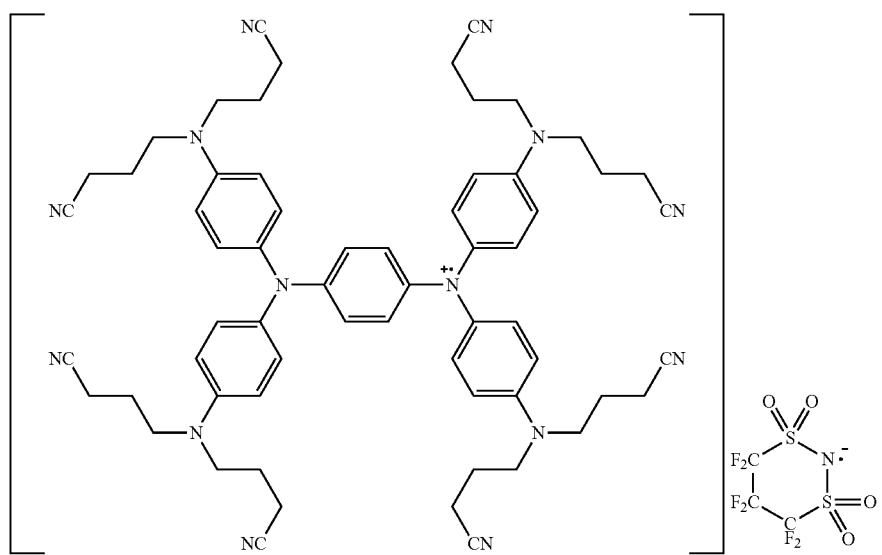
Compound (128)
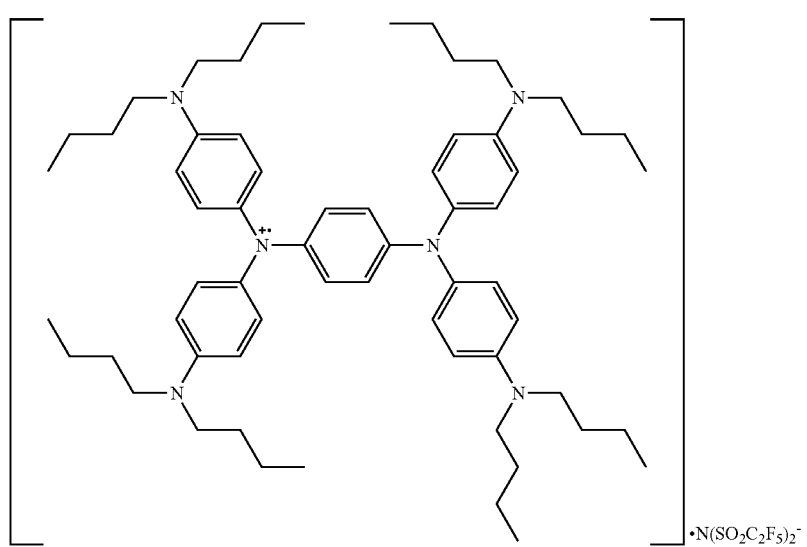
Compound (129)
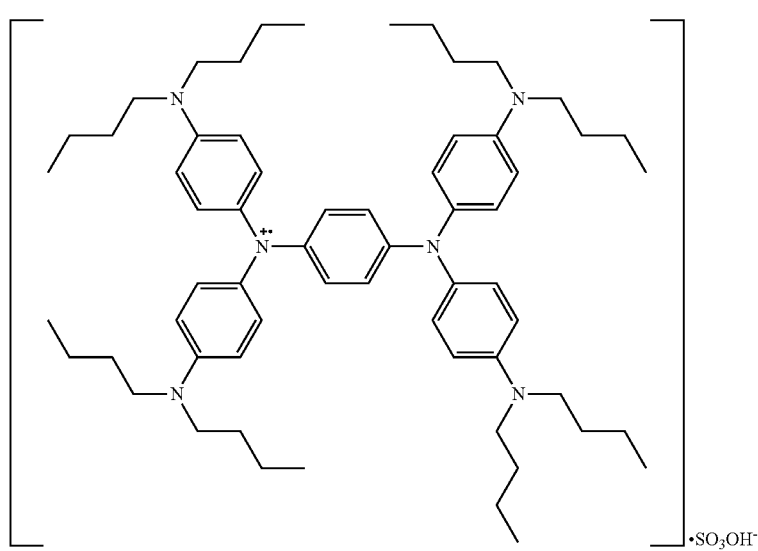

-continued
Compound (130)
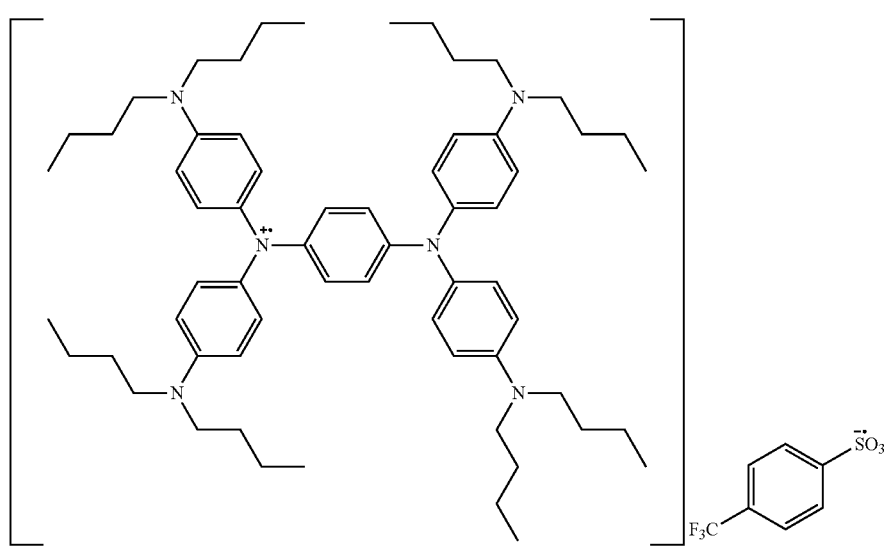
Compound (131)
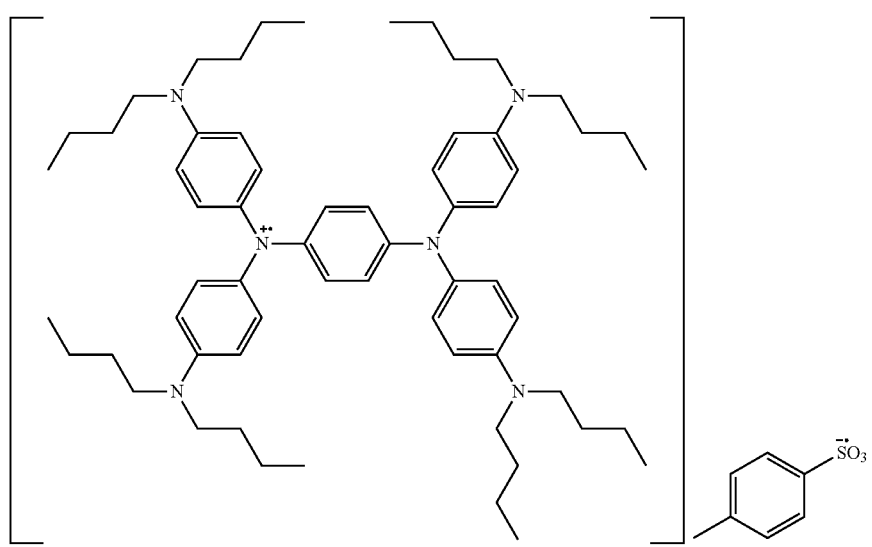
Compound (132)
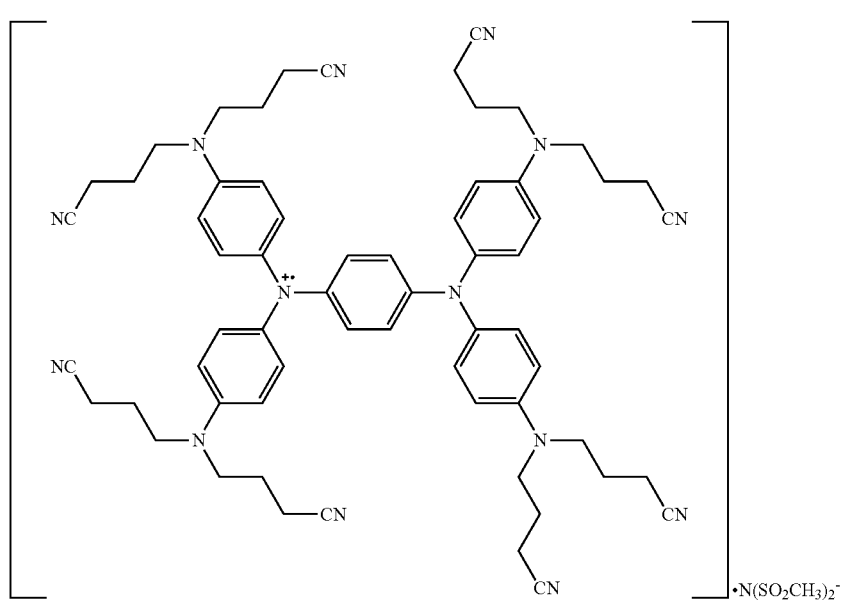

Of the above compounds, at least one of the compounds (1), (3), (5), (9), (11), (20), (22), (23), (25), (26), (122), (123), and (124) is preferably used because an image with further improved imbalance tends to be formed. In particular, at least one of the compounds (1), (3), (20), (25), (122), and (124) is preferably used.

Dye Contained in Coloring Material Layer Supported on Ink Sheet

A dye contained in the coloring material layer of the ink sheet will be described.

Yellow Dye

A yellow dye represented by general formula (3) will be described.

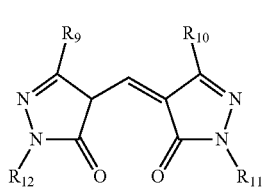

General formula (3)

In the general formula (3), $R_9$ to $R_{12}$ each independently represent an alkyl group or an aryl group that optionally has a substituent.

In the general formula (3), the alkyl group represented by $R_9$ to $R_{12}$ is not particularly limited, and may be a linear, branched, or cyclic primary to tertiary alkyl group having 1 to 20 carbon atoms. Specific examples of the alkyl group include a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. An alkyl group having 1 to 4 carbon atoms is particularly used because an image with further improved imbalance is formed.

In the general formula (3), the aryl group that optionally has a substituent and is represented by $R_9$ to $R_{12}$ is not particularly limited. An example of the substituent is an alkyl group. The total number of carbon atoms of the aryl group (including the number of carbon atoms of the substituent) may be, for example, 6 to 10.

Specific examples of the aryl group that optionally has a substituent include a phenyl group, a tolyl group (2-methylphenyl group, 3-methylphenyl group, or 4-methylphenyl group), and a naphthyl group. Of these aryl groups, a phenyl group is particularly used because an image with further improved imbalance tends to be formed.

Non-limiting examples of the compound represented by the general formula (3) include compounds (30) to (37) below.

Compound (30)

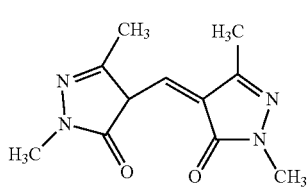

Compound (31)

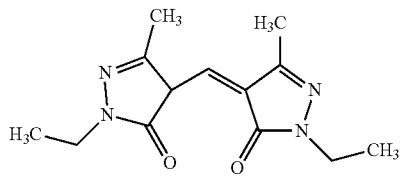

Compound (32)

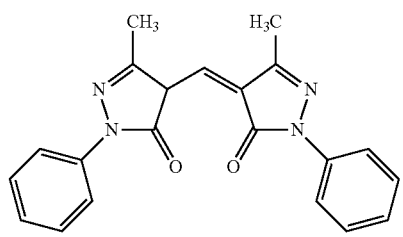

Compound (33)

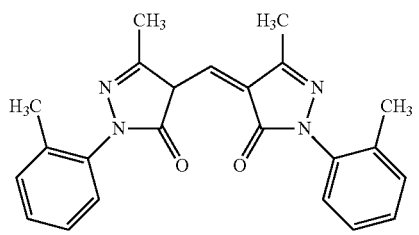

Compound (34)

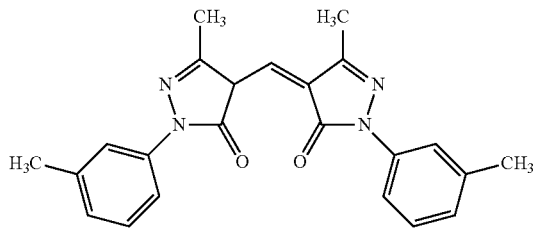

Compound (35)

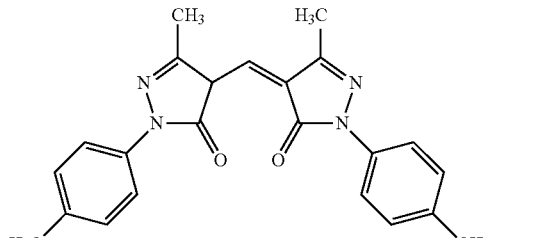

Compound (36)

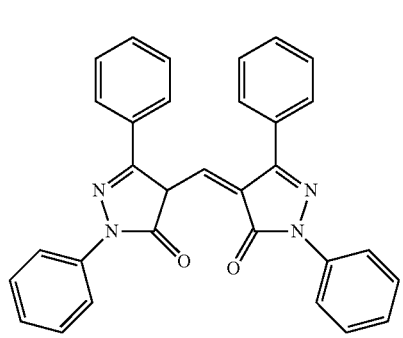

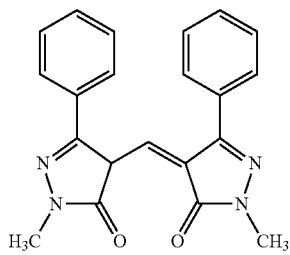

Compound (37)

Of these compounds, the compounds (32) to (35) are preferred as a yellow dye. The compound (32) is particularly preferred because an image with further improved imbalance is formed.

Next, a yellow dye represented by general formula (4) will be described.

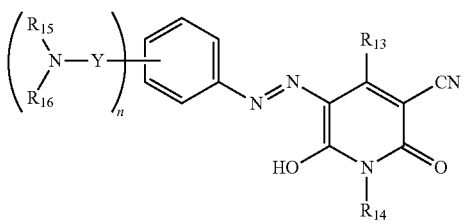

General formula (4)

In the general formula (4), $R_{13}$ represents an alkyl group, an aryl group that optionally has a substituent, or an amino group that optionally has a substituent; $R_{14}$ represents a hydrogen atom, an alkyl group, an aryl group that optionally has a substituent, or —N(—$R_a$)$R_b$, where $R_a$ and $R_b$ each independently represent a hydrogen atom, an alkyl group, or an acyl group and $R_a$ and $R_b$ optionally bond to each other so as to form a ring; $R_{15}$ represents an alkyl group; $R_{16}$ represents a hydrogen atom or an alkyl group; Y represents a carbonyl group or a sulfonyl group; and n represents an integer of 1 to 3.

In the general formula (4), the alkyl group represented by $R_{13}$ may be any alkyl group. Examples of the alkyl group include linear or branched alkyl groups having 1 to 4 carbon atoms, such as a methyl group, an ethyl group, a propyl group, and a butyl group.

In the general formula (4), the aryl group that optionally has a substituent and is represented by $R_{13}$ may be any substituted or unsubstituted aryl group. Examples of the substituent include alkyl groups such as a methyl group. The total number of carbon atoms of the aryl group (including the number of carbon atoms of the substituent) may be, for example, 6 to 12.

Specific examples of the aryl group that optionally has a substituent include a phenyl group and a tolyl group (2-methylphenyl group, 3-methylphenyl group, or 4-methylphenyl group).

In the general formula (4), the amino group (—NH$_2$, —NHRc, or —NRcRd (Rc and Rd represent a substituent)) that optionally has a substituent and is represented by $R_{13}$ may be any substituted or unsubstituted amino group. Examples of the substituent include alkyl groups such as a methyl group and an ethyl group.

Specific examples of the amino group that optionally has a substituent include a monomethylamino group, a dimethylamino group, and a diethylamino group.

Among them, $R_{13}$ is preferably an alkyl group because an image with further improved imbalance tends to be formed. $R_{13}$ is more preferably a methyl group from the same viewpoint.

In the general formula (4), the alkyl group represented by $R_{14}$ may be any alkyl group. Examples of the alkyl group include linear, branched, or cyclic primary to tertiary alkyl groups having 1 to 20 carbon atoms.

Specific examples of the alkyl group include a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group.

Of these alkyl groups, a methyl group, an ethyl group, a n-propyl group, an iso-propyl group, a n-butyl group, and a 2-ethylhexyl group are preferably used because an image with further improved imbalance tends to be formed. In particular, an ethyl group and a n-propyl group are more preferably used from the same viewpoint.

In the general formula (4), the aryl group that optionally has a substituent and is represented by $R_{14}$ may be any substituted or unsubstituted aryl group. The aryl group may be, for example, the same aryl group as in $R_{13}$ of the general formula (4).

In the general formula (4), when $R_{14}$ represents —N(—$R_a$)$R_b$, the alkyl group represented by $R_a$ and $R_b$ may be any alkyl group. The alkyl group may be, for example, the same alkyl group as in $R_{14}$ of the general formula (4).

In the general formula (4), when $R_{14}$ represents —N(—$R_a$)$R_b$, the acyl group represented by $R_a$ and $R_b$ may be any acyl group. Examples of the acyl group include alkylcarbonyl groups such as an acetyl group and an ethylhexynoyl group and arylcarbonyl groups such as a benzoyl group.

In the general formula (4), when $R_{14}$ represents —N(—$R_a$)$R_b$, the cyclic structure formed by bonding $R_a$ and $R_b$ can be appropriately selected from the viewpoint of imbalance and may be any cyclic structure. Examples of the cyclic structure include a pyrrolidine ring, a piperidine ring, an azepane ring, and an azocane ring.

In particular, at least one of $R_a$ and $R_b$ is preferably an alkyl group because an image with further improved imbalance tends to be formed. From the same viewpoint, at least one of $R_a$ and $R_b$ is more preferably a methyl group.

In the general formula (4), the alkyl group represented by $R_{15}$ and $R_{16}$ may be any alkyl group. The alkyl group may be, for example, the same alkyl group as in $R_{14}$ of the general formula (4).

Among them, $R_{15}$ and $R_{16}$ preferably each independently represent the following group because an image with further improved imbalance tends to be formed. That is, $R_{15}$ and $R_{16}$ preferably each independently represent an ethyl group, a n-butyl group, a sec-butyl group, a dodecyl group, a cyclohexyl group, a methylcyclohexyl group, a 2-ethylpropyl group, or a 2-ethylhexyl group and more preferably a n-butyl group or a 2-ethylhexyl group. $R_{15}$ and $R_{16}$ preferably represent the same alkyl group because an image with further improved imbalance tends to be formed.

In the general formula (4), Y represents a carbonyl group or a sulfonyl group, and particularly represents a carbonyl group because an image with further improved imbalance tends to be formed.

In the general formula (4), n represents an integer of 1 to 3, and particularly represents 1 because an image with further improved imbalance tends to be formed.

In the general formula (4), an azo form is illustrated, but a hydrazo form, which is a tautomer, is also in the scope of the present disclosure.

In the general formula (4), the bonding site of the $R_{15}(R_{16}-)N-Y-$ group to the phenyl group is not particularly limited, and can be appropriately determined.

Non-limiting examples of the compound represented by the general formula (4) include compounds (38) to (42) below.

Compound (38)

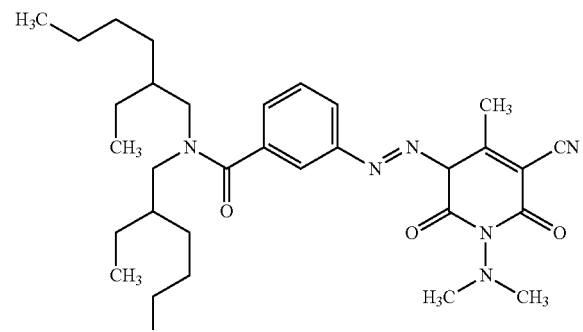

Compound (39)

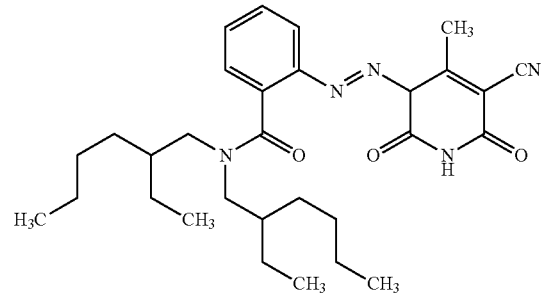

Compound (40)

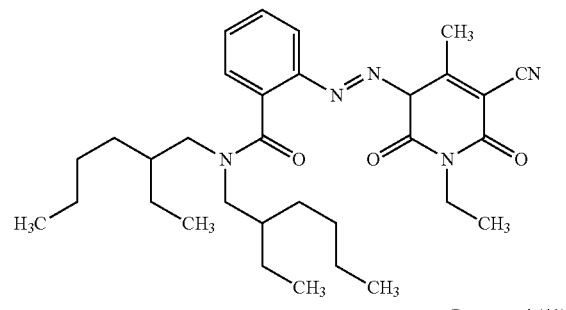

Compound (41)

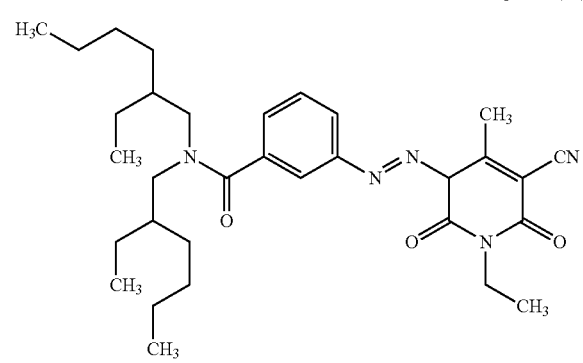

Compound (42)

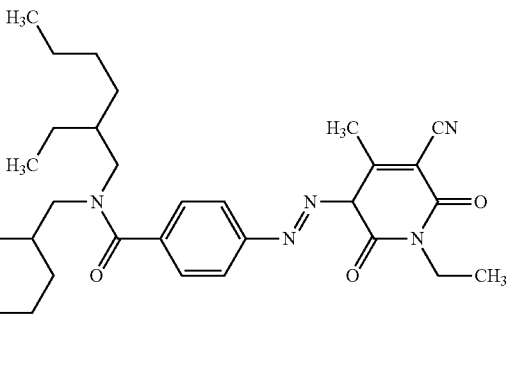

Of these compounds, the compounds (40) to (42) are particularly used because an image with further improved imbalance is formed.

Next, a yellow dye represented by general formula (5) will be described.

General formula (5)

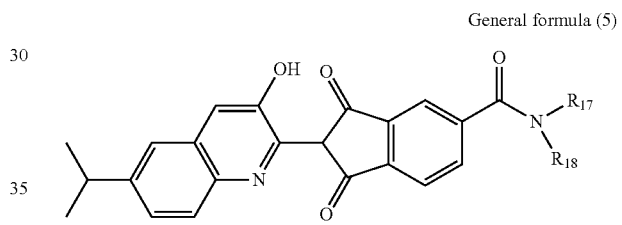

In the general formula (5), $R_{17}$ and $R_{18}$ each independently represent an alkyl group or an aryl group.

In the general formula (5), the alkyl group represented by $R_{17}$ and $R_{18}$ is not particularly limited, and may be, for example, a linear, branched, or cyclic primary to tertiary alkyl group having 1 to 20 carbon atoms. Specific examples of the alkyl group include a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. Of these alkyl groups, a linear or branched alkyl group having 1 to 8 carbon atoms (e.g., propyl group, butyl group, and 2-ethylhexyl group) is preferably used because an image with further improved imbalance tends to be formed. From the viewpoint of imbalance, $R_{17}$ and $R_{18}$ each more preferably represent a n-butyl group.

In the general formula (5), the aryl group represented by $R_{17}$ and $R_{18}$ is not particularly limited, and may be, for example, a phenyl group or a naphthyl group. A phenyl group is particularly used because an image with further improved imbalance is formed.

Non-limiting examples of the compound represented by the general formula (5) include compounds (43) to (48) below.

Compound (43)

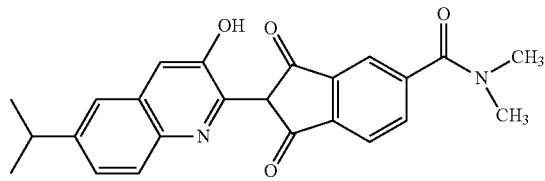

Compound (44)

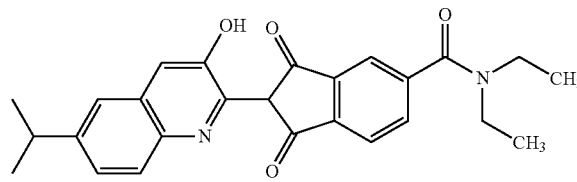

Compound (45)

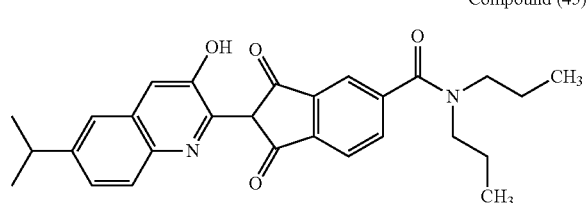

Compound (46)

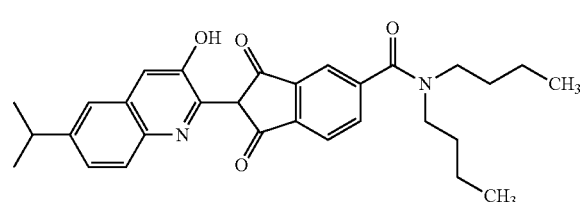

Compound (47)

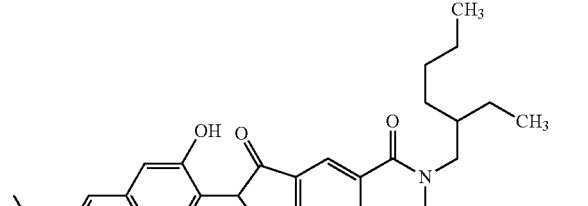

Compound (48)

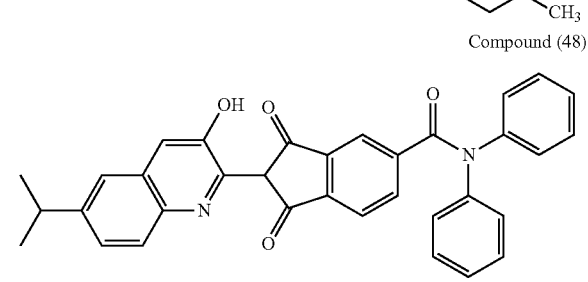

Of these compounds, the compounds (45) to (47) are preferred as a yellow dye and the compound (46) is particularly preferred because an image with further improved imbalance is formed.

Next, a yellow dye represented by general formula (6) will be described.

General formula (6)

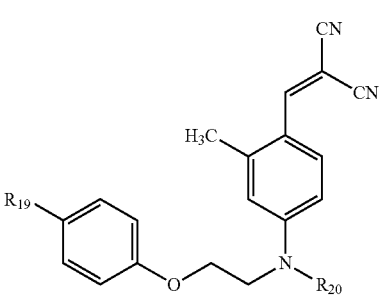

In the general formula (6), $R_{19}$ and $R_{20}$ each independently represent an alkyl group or an aryl group.

In the general formula (6), the alkyl group represented by $R_{19}$ and $R_{20}$ is not particularly limited, and may be, for example, a linear, branched, or cyclic primary to tertiary alkyl group having 1 to 20 carbon atoms. Specific examples of the alkyl group include a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group.

Of these alkyl groups, $R_{19}$ preferably represents a linear, branched, or cyclic alkyl group having 1 to 6 carbon atoms (e.g., methyl group, butyl group, and cyclohexyl group) and more preferably represents a cyclohexyl group.

Of these alkyl groups, $R_{20}$ preferably represents a linear alkyl group having 1 to 8 carbon atoms (e.g., methyl group, ethyl group, and octyl group) and more preferably represents an ethyl group from the viewpoint of imbalance.

In the general formula (6), the aryl group represented by $R_{19}$ and $R_{20}$ is not particularly limited, and may be, for example, a phenyl group or a naphthyl group. A phenyl group is particularly used because an image with further improved imbalance is formed.

Non-limiting examples of the compound represented by the general formula (6) include compounds (49) to (53) below.

Compound (49)

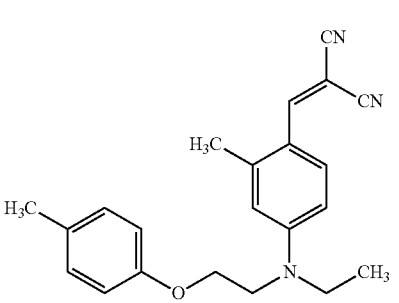

Compound (50)

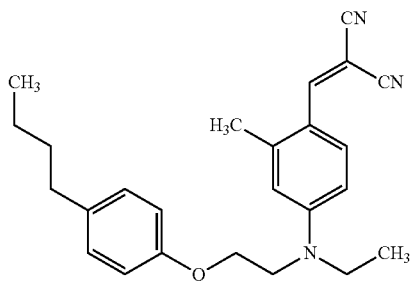

Compound (54)

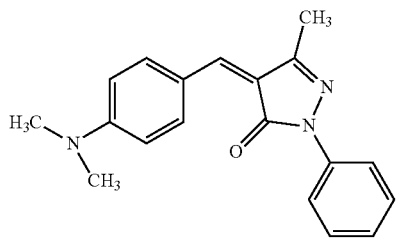

Compound (51)

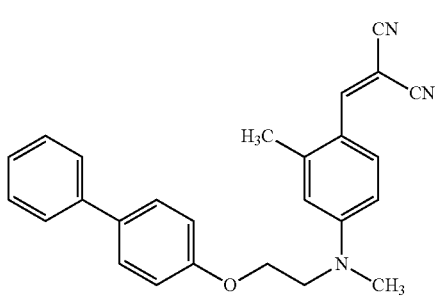

Compound (55)

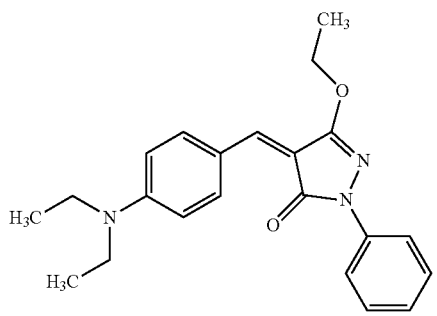

Compound (52)

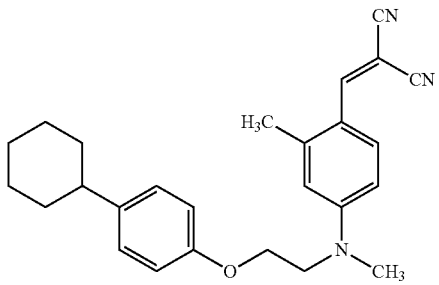

Cyan Dye

Next, a cyan dye represented by general formula (7) will be described.

General formula (7)

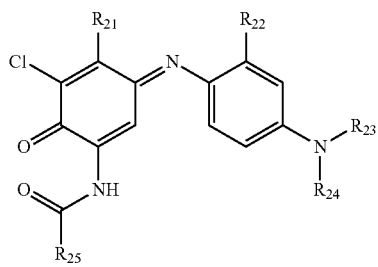

Compound (53)

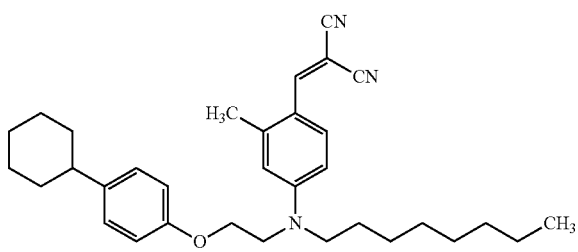

Of these compounds, the compounds (52) and (53) are preferably used as a yellow dye and the compound (52) is particularly preferably used because an image with further improved imbalance is formed.

Another yellow dye may be added for color adjustment. Non-limiting examples of the other yellow dye include compounds (54) and (55).

In the general formula (7), $R_{21}$ to $R_{25}$ each independently represent an alkyl group or an aryl group.

In the general formula (7), the alkyl group and aryl group represented by $R_{21}$ to $R_{25}$ are not particularly limited. The alkyl group and the aryl group may be, for example, the same alkyl group and aryl group as those described regarding $R_{19}$ and $R_{20}$ in the general formula (6). Of these alkyl groups, a linear or branched alkyl group having 1 to 4 carbon atoms (e.g., methyl group, ethyl group, n-butyl group, and t-butyl group) is preferably used because an image with further improved imbalance tends to be formed. From the viewpoint of imbalance, a methyl group or an ethyl group is more preferably used.

Of these aryl groups, a phenyl group is particularly used because an image with further improved imbalance tends to be formed.

Non-limiting examples of the compound represented by the general formula (7) include compounds (56) to (62) below.

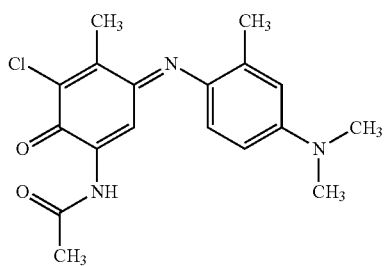
Compound (56)

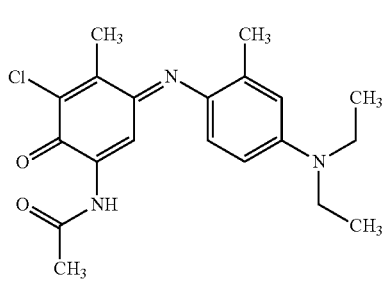
Compound (57)

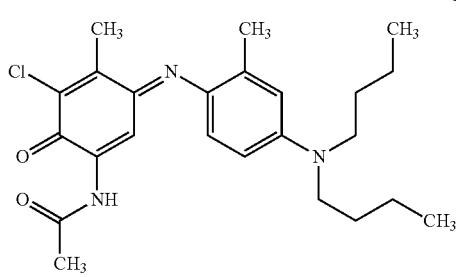
Compound (58)

Compound (59)

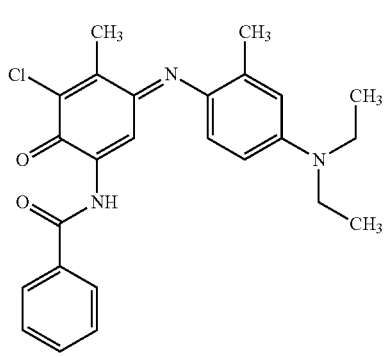
Compound (60)

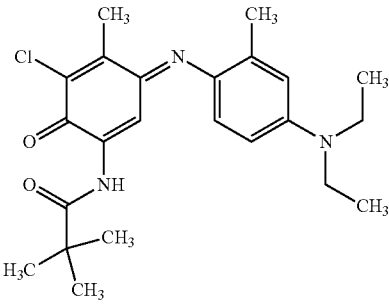
Compound (61)

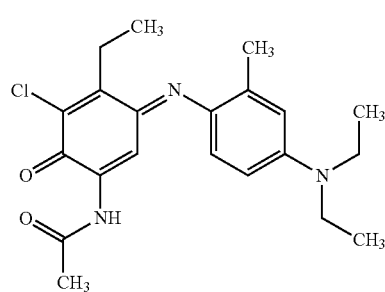
Compound (62)

Of these compounds, the compounds (56) to (58) are preferred as a cyan dye and the compound (57) is particularly preferred because an image with further improved imbalance is formed.

Next, a cyan dye represented by general formula (8) will be described.

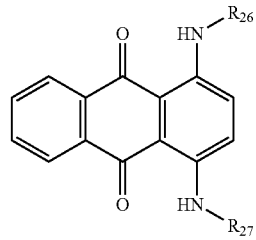
General formula (8)

In the general formula (8), $R_{26}$ and $R_{27}$ each independently represent an alkyl group or an aryl group that optionally has a substituent.

In the general formula (8), the alkyl group represented by $R_{26}$ and $R_{27}$ is not particularly limited. The alkyl group may be, for example, the same alkyl group as that described regarding $R_{19}$ and $R_{20}$ in the general formula (6). Of these alkyl groups, a linear alkyl group having 1 to 4 carbon atoms (e.g., methyl group and butyl group) is particularly used because an image with further improved imbalance tends to be formed.

In the general formula (8), the aryl group that optionally has a substituent and is represented by $R_{26}$ and $R_{27}$ may be any substituted or unsubstituted aryl group. An example of the substituent is an alkyl group.

The total number of carbon atoms of the aryl group (including the number of carbon atoms of the substituent) may be, for example, 6 to 10.

Examples of the aryl group that optionally has a substituent include a phenyl group, a tolyl group (e.g., 3-methylphenyl group), a p-(n-butyl)phenyl group, and a naphthyl group. Of these aryl groups, a tolyl group (e.g., 3-methylphenyl group) is particularly used because an image with further improved imbalance tends to be formed.

Non-limiting examples of the compound represented by the general formula (8) include compounds (63) to (68) below.

Compound (63)

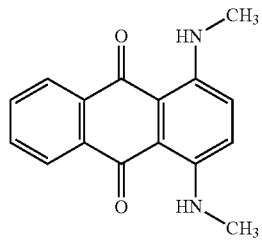

Compound (64)

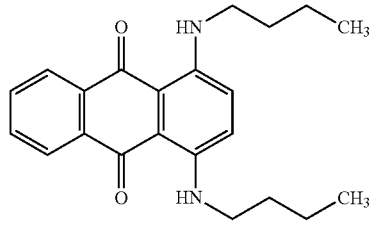

Compound (65)

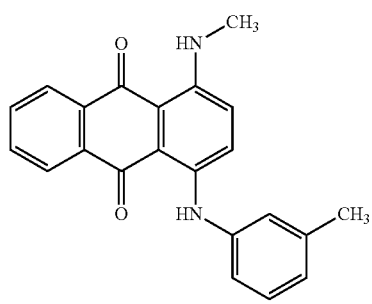

Compound (66)

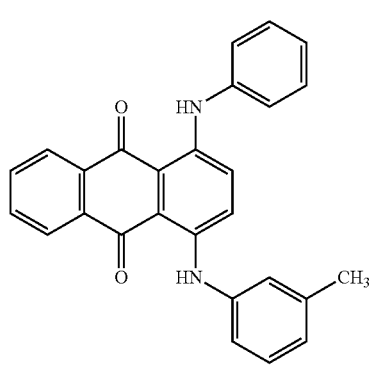

Compound (67)

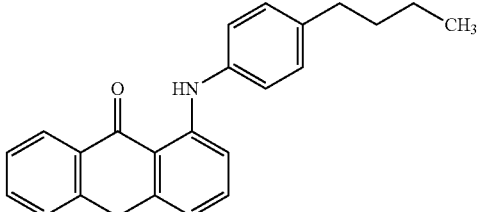

Compound (68)

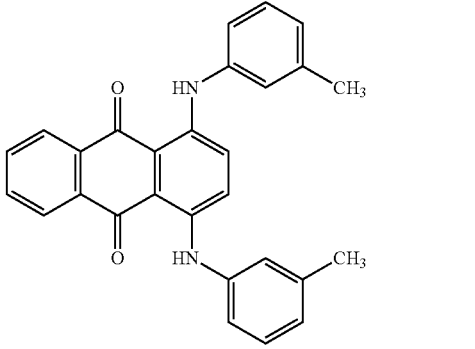

Of these compounds, the compounds (64) to (66) are preferred as a cyan dye and the compound (65) is particularly preferred because an image with further improved imbalance is formed.

Next, a cyan dye represented by general formula (9) will be described.

General formula (9)

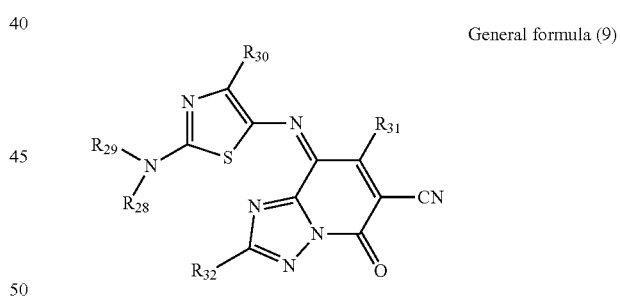

In the general formula (9), $R_{28}$ to $R_{32}$ each independently represent an alkyl group or an aryl group.

In the general formula (9), the alkyl group represented by $R_{28}$ to $R_{32}$ is not particularly limited, and may be, for example, a linear, branched, or cyclic primary to tertiary alkyl group having 1 to 20 carbon atoms. Specific examples of the alkyl group include a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. Of these alkyl groups, a linear or branched alkyl group having 1 to 8 carbon atoms (e.g., methyl group, 1-ethylpentyl group, and 2-ethylhexyl group) is particularly used because an image with further improved imbalance tends to be formed.

In the general formula (9), the aryl group represented by $R_{28}$ to $R_{32}$ is not particularly limited, and may be, for example, a phenyl group or a naphthyl group. A phenyl group is particularly used because an image with further improved imbalance is formed.

Non-limiting examples of the compound represented by the general formula (9) include compounds (69) to (74) below.

Compound (69)

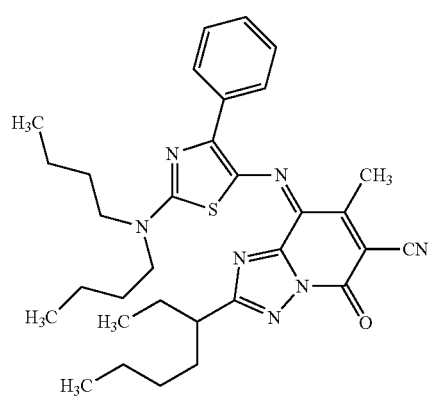

Compound (70)

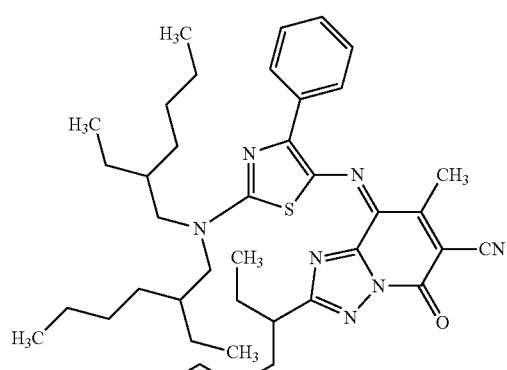

Compound (71)

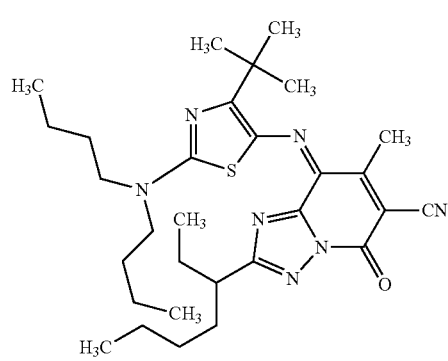

Compound (72)

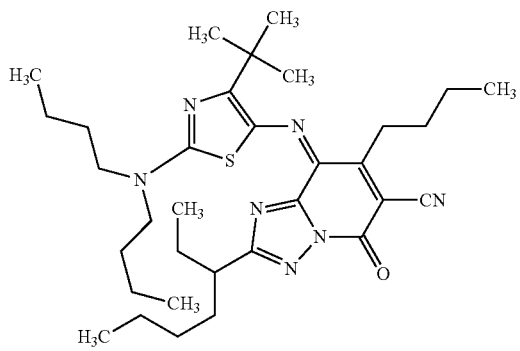

Compound (73)

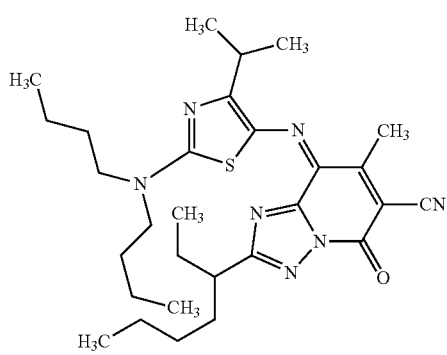

Compound (74)

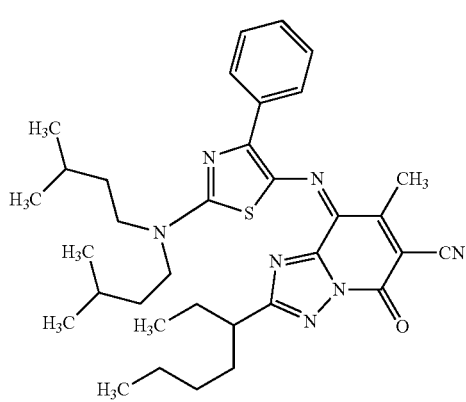

Of these compounds, the compounds (69), (70), and (74) are preferred as a cyan dye and the compound (69) is particularly preferred because an image with further improved imbalance is formed.

In addition to the compounds represented by the general formulae (7) to (9), known cyan dyes may also be used in combination.

Magenta Dye

Next, a magenta dye represented by general formula (10) will be described.

General formula (10)

In the general formula (10), R$_{33}$ represents an alkyl group that optionally contains an ethereal oxygen atom or an aryl group that optionally has a substituent.

In the general formula (10), the alkyl group that optionally contains an ethereal oxygen atom and is represented by R$_{33}$ is not particularly limited. The alkyl group may be, for example, a linear, branched, or cyclic primary to tertiary alkyl group that has 1 to 20 carbon atoms and optionally contains an ethereal oxygen atom.

Specific examples of the alkyl group that optionally contains an ethereal oxygen atom include a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, a 2-ethylhexyl group, and an ethoxyethyl group. Of these alkyl groups, a linear or branched alkyl group that has 1 to 8 carbon atoms and optionally contains an ethereal oxygen atom is particularly used because an image with further improved imbalance tends to be formed. The alkyl group having 1 to 8 carbon atoms may be, for example, a methyl group, a 2-ethylhexyl group, or an ethoxyethyl group.

In the general formula (10), the aryl group that optionally has a substituent and is represented by R$_{33}$ may be any substituted or unsubstituted aryl group. Examples of the substituent include alkyl groups and alkoxy groups. The total number of carbon atoms of the aryl group (including the number of carbon atoms of the substituent) may be, for example, 6 to 10.

Examples of the aryl group that optionally has a substituent include a phenyl group, a tolyl group (2-methylphenyl group, 3-methylphenyl group, or 4-methylphenyl group), a naphthyl group, and a p-methoxyphenyl group. Of these aryl groups, a phenyl group, a tolyl group, a methoxyphenyl group, and a naphthyl group are preferably used because an image with further improved imbalance tends to be formed. From the viewpoint of imbalance, a phenyl group and a 3-methylphenyl group are more preferably used.

Non-limiting examples of the compound represented by the general formula (10) include compounds (75) to (83) below.

Compound (75)

Compound (76)

Compound (77)

Compound (78)

Compound (79)

Compound (80)

Compound (81)

Compound (82)

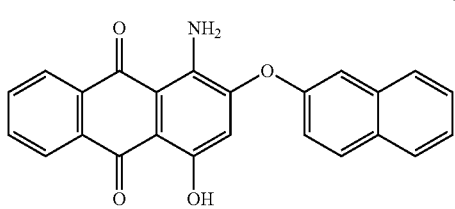

Compound (83)

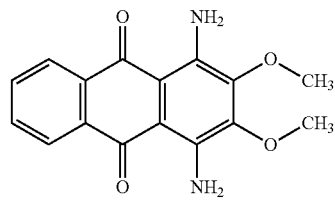

Compound (84)

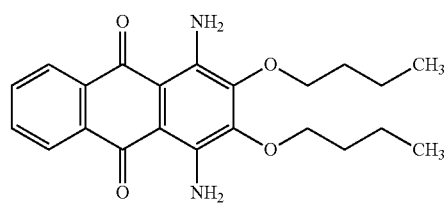

Compound (85)

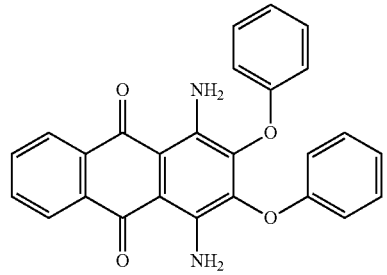

Compound (86)

Of these compounds, the compounds (75) to (79) are preferred as a magenta dye and the compounds (75) and (77) are particularly preferred because an image with further improved imbalance is formed.

Next, a magenta dye represented by general formula (11) will be described.

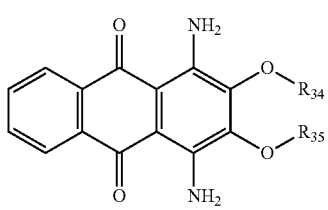

General formula (11)

In the general formula (11), $R_{34}$ and $R_{35}$ each independently represent an alkyl group or an aryl group that optionally has a substituent.

In the general formula (11), the alkyl group represented by $R_{34}$ and $R_{35}$ is not particularly limited. The alkyl group may be, for example, the same alkyl group as that described regarding $R_{19}$ and $R_{20}$ in the general formula (6). Of these alkyl groups, a linear alkyl group having 1 to 4 carbon atoms (e.g., methyl group and butyl group) is particularly used because an image with further improved imbalance tends to be formed.

In the general formula (11), the aryl group that optionally has a substituent and is represented by $R_{34}$ and $R_{35}$ may be any substituted or unsubstituted aryl group. An example of the substituent is an alkyl group. The total number of carbon atoms of the aryl group (including the number of carbon atoms of the substituent) may be, for example, 6 to 10.

Examples of the aryl group that optionally has a substituent include a phenyl group, a tolyl group (2-methylphenyl group, 3-methylphenyl group, or 4-methylphenyl group), a xylyl group (e.g., 3,5-dimethylphenyl group), a naphthyl group, and a p-(n-butyl)phenyl group.

Of these aryl groups, a phenyl group, a tolyl group (e.g., 4-methylphenyl group), and a xylyl group (e.g., 3,5-dimethylphenyl group) are particularly used because an image with further improved imbalance tends to be formed.

Non-limiting examples of the compound represented by the general formula (11) include compounds (84) to (92) below.

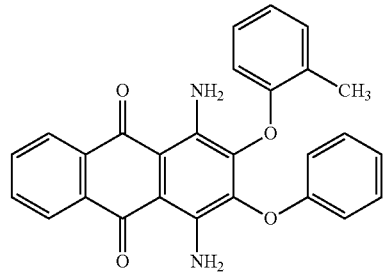

Compound (87)

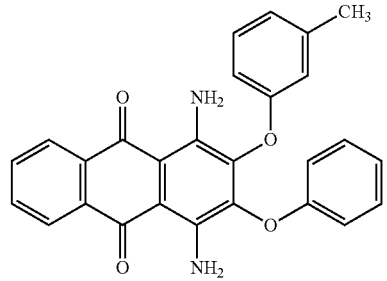

Compound (88)

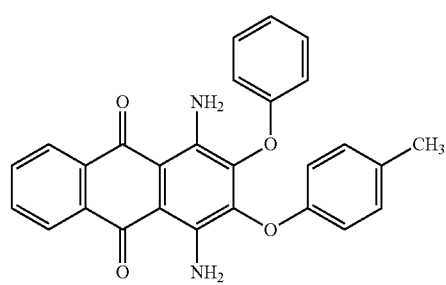

Compound (89)

-continued

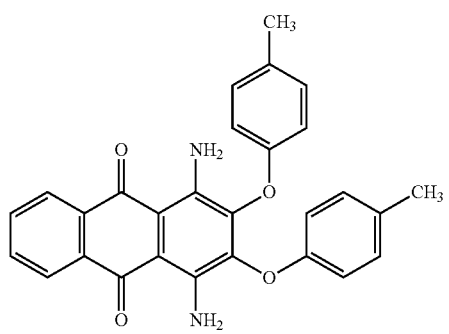
Compound (90)

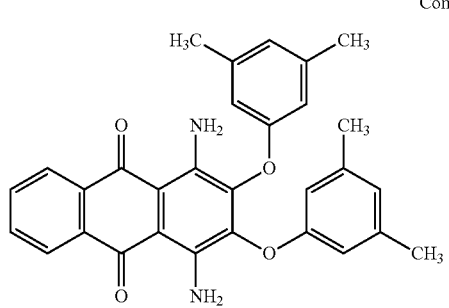
Compound (91)

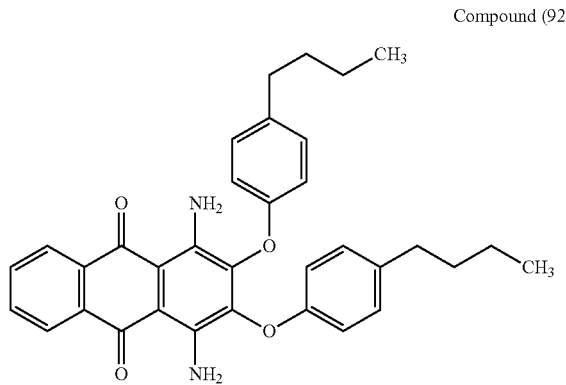
Compound (92)

Of these compounds, the compounds (86) to (91) are preferred as a magenta dye and the compounds (86), (90), and (91) are particularly preferred because an image with further improved imbalance is formed.

Next, a magenta dye represented by general formula (12) will be described.

General formula (12)

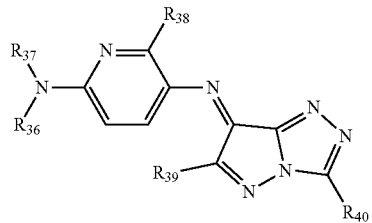

In the general formula (12), $R_{36}$ to $R_{40}$ each independently represent an alkyl group or an aryl group that optionally has a substituent.

In the general formula (12), the alkyl group represented by $R_{36}$ to $R_{40}$ may be any alkyl group. The alkyl group may be, for example, the same alkyl group as that described regarding $R_{19}$ and $R_{20}$ in the general formula (6). Of these alkyl groups, a linear or branched alkyl group having 1 to 4 carbon atoms (e.g., methyl group, ethyl group, n-butyl group, and t-butyl group) is particularly used because an image with further improved imbalance tends to be formed.

In the general formula (12), the aryl group that optionally has a substituent and is represented by $R_{36}$ to $R_{40}$ may be any substituted or unsubstituted aryl group. Examples of the substituent include alkyl groups and alkoxy groups. The total number of carbon atoms of the aryl group (including the number of carbon atoms of the substituent) may be, for example, 6 to 10.

Examples of the aryl group that optionally has a substituent include a phenyl group, a tolyl group (2-methylphenyl group, 3-methylphenyl group, or 4-methylphenyl group), a naphthyl group, and a p-methoxyphenyl group.

Of these aryl groups, a phenyl group, a tolyl group, and a methoxyphenyl group are preferably used and a tolyl group is more preferably used because an image with further improved imbalance tends to be formed.

Non-limiting examples of the compound represented by the general formula (12) include compounds (93) to (101) below.

Compound (93)

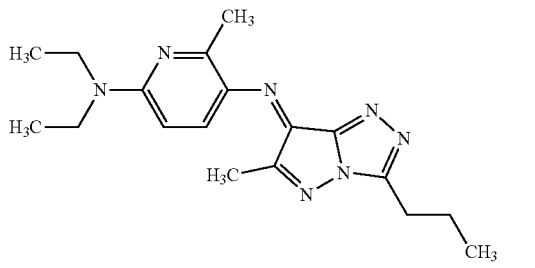

Compound (94)

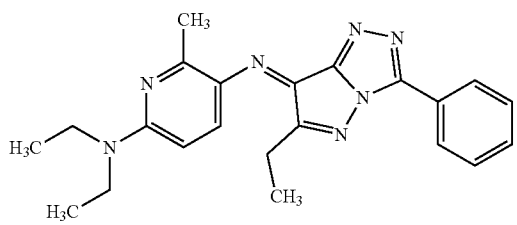

Compound (95)

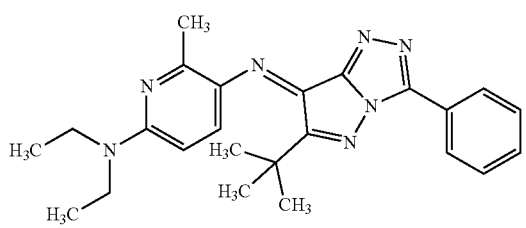

Compound (96)

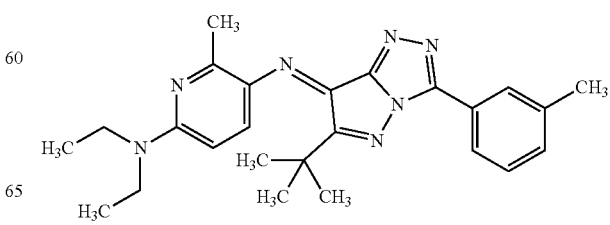

Compound (97)

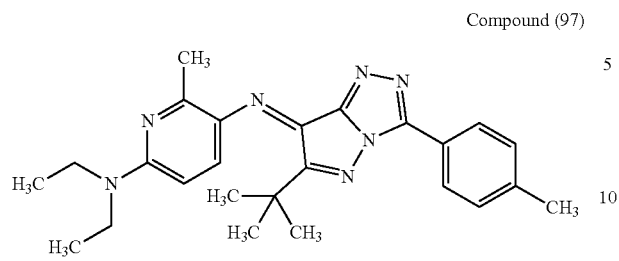

Compound (98)

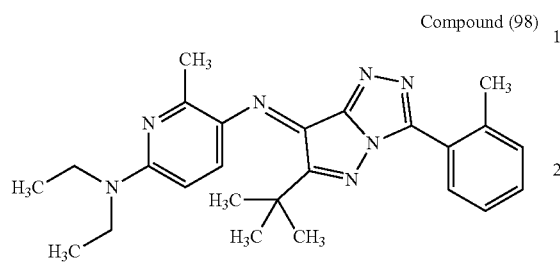

Compound (99)

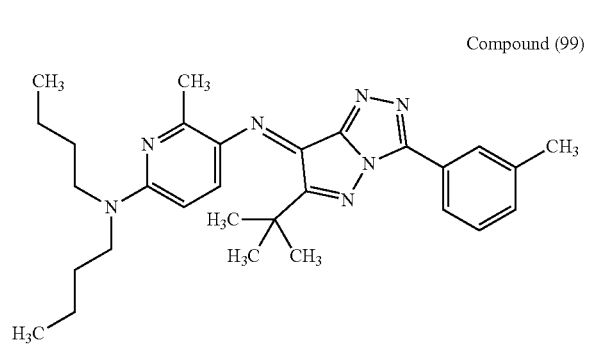

Compound (100)

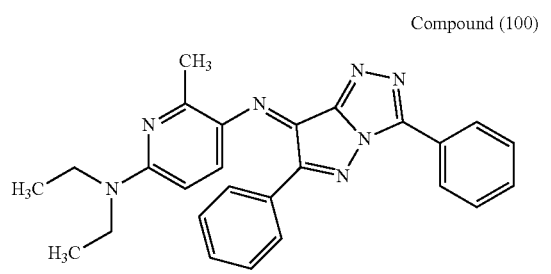

Compound (101)

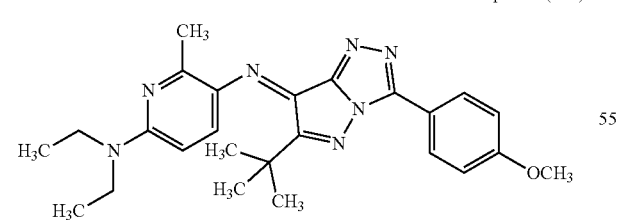

Of these compounds, the compounds (95) to (99) are preferred as a magenta dye and the compounds (96) to (98) are particularly preferred because an image with further improved imbalance is formed.

Next, a magenta dye represented by general formula (13) will be described.

General formula (13)

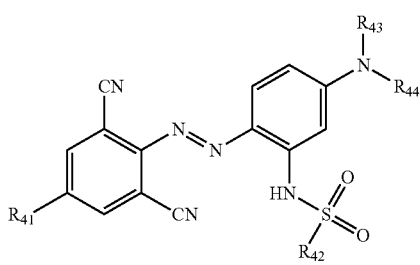

In the general formula (13), $R_{41}$ to $R_{44}$ each independently represent an alkyl group or an aryl group that optionally has a substituent.

In the general formula (13), the alkyl group represented by $R_{41}$ to $R_{44}$ is not particularly limited. The alkyl group may be, for example, the same alkyl group as that described regarding $R_{19}$ and $R_{20}$ in the general formula (6). Of these alkyl groups, a linear or branched alkyl group having 1 to 4 carbon atoms (e.g., methyl group, ethyl group, n-propyl group, and t-butyl group) is particularly used because an image with further improved imbalance tends to be formed.

In the general formula (13), the aryl group that optionally has a substituent and is represented by $R_{41}$ to $R_{44}$ may be any substituted or unsubstituted aryl group. An example of the substituent is an alkyl group. The total number of carbon atoms of the aryl group (including the number of carbon atoms of the substituent) may be, for example, 6 to 10.

Examples of the aryl group that optionally has a substituent include a phenyl group, a tolyl group (e.g., 4-methylphenyl group), and a naphthyl group.

Of these aryl groups, a phenyl group and a tolyl group are particularly used because an image with further improved imbalance tends to be formed.

Non-limiting examples of the compound represented by the general formula (13) include compounds (102) to (110) below.

Compound (102)

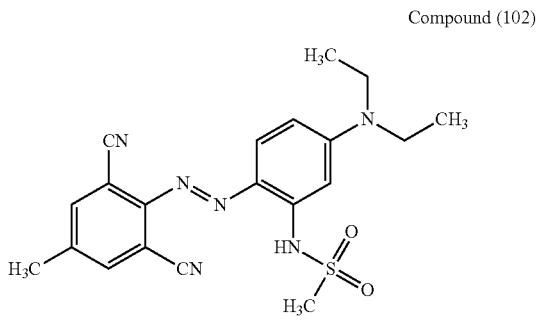

Compound (103)

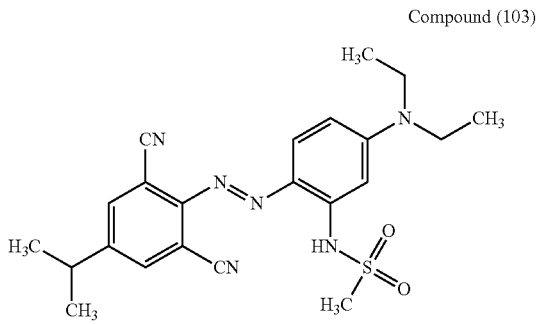

Compound (104)
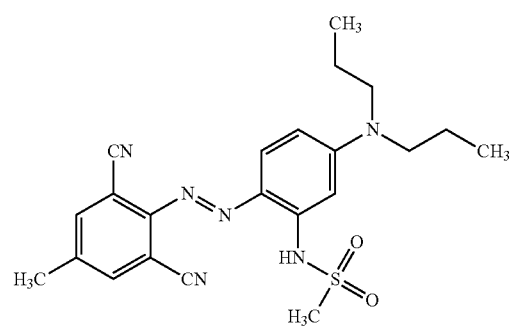
Compound (105)
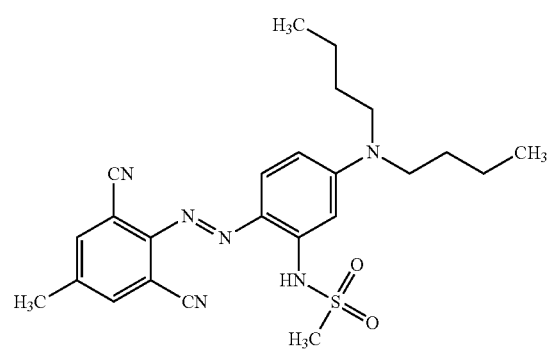
Compound (106)
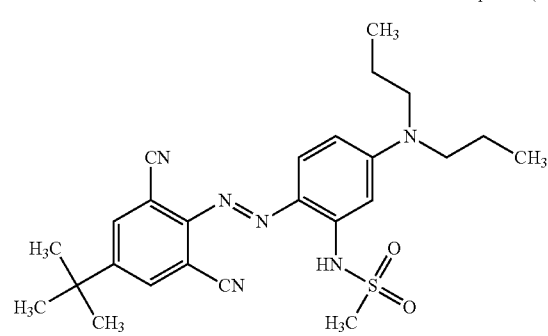
Compound (107)
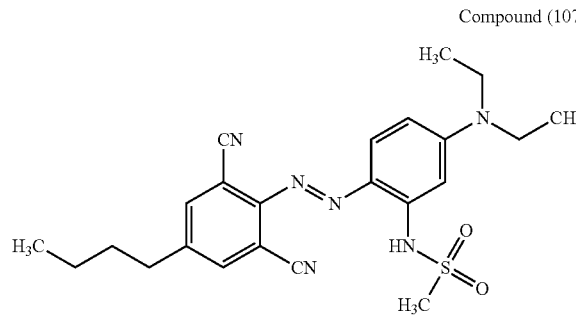
Compound (108)
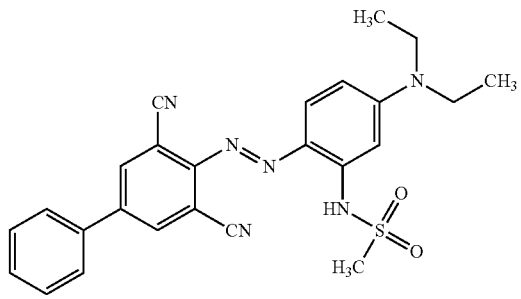
Compound (109)
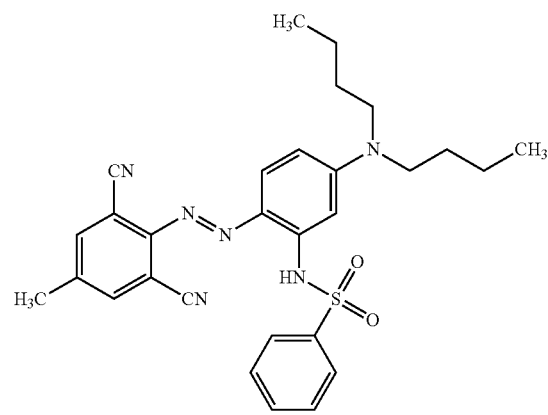
Compound (110)
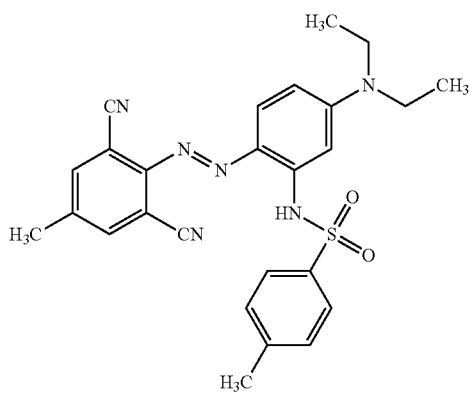
Of these compounds, the compounds (102), (104), (105), and (106) are preferred as a magenta dye and the compound (104) is particularly preferred because an image with further improved imbalance is formed.
Next, a magenta dye represented by general formula (14) will be described.
General formula (14)
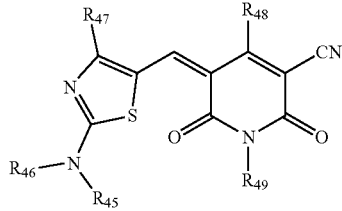

In the general formula (14), $R_{45}$ and $R_{46}$ each independently represent an alkyl group; $R_{47}$ represents a hydrogen atom, an alkyl group, or an aryl group that optionally has a substituent; $R_{48}$ represents an alkyl group or an aryl group that optionally has a substituent; and $R_{49}$ represents a hydrogen atom, an alkyl group, an aryl group that optionally has a substituent, or —N(—$R_{50}$)$R_{51}$, where $R_{50}$ and $R_{51}$ each independently represent a hydrogen atom, an alkyl group, an aryl group, or an acyl group, or $R_{50}$ and $R_{51}$ bond to each other so as to form a cyclic structure.

In the general formula (14), the alkyl group represented by $R_{45}$ and $R_{46}$ is not particularly limited, and may be a linear, branched, or cyclic primary to tertiary alkyl group having 1 to 20 carbon atoms. Specific examples of the alkyl group include a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-butylbutyl group, a 2-ethylpropyl group, and a 2-ethylhexyl group. A branched alkyl group such as a 2-butylbutyl group or a 2-ethylhexyl group is particularly used because an image with further improved imbalance is formed.

In the general formula (14), the alkyl group represented by $R_{47}$ may be any alkyl group. The alkyl group may be, for example, the same alkyl group as that described regarding $R_{19}$ and $R_{20}$ in the general formula (6). Of these alkyl groups, a tert-butyl group is particularly used because an image with further improved imbalance tends to be formed.

In the general formula (14), the aryl group that optionally has a substituent and is represented by $R_{47}$ may be any substituted or unsubstituted aryl group. Examples of the substituent include alkyl groups such as a methyl group and an ethyl group and alkoxy groups such as a methoxy group. The total number of carbon atoms of the aryl group (including the number of carbon atoms of the substituent) may be, for example, 6 to 12.

Examples of the aryl group that optionally has a substituent include a phenyl group, a tolyl group (2-methylphenyl group, 3-methylphenyl group, and 4-methylphenyl group), a xylyl group (e.g., 2,6-dimethylphenyl group), a 2,6-diethylphenyl group, a 3-methoxyphenyl group, a 2,6-dimethoxyphenyl group, a 2,4,6-trimethylphenyl group, and a 2,4,6-triethylphenyl group. Of these aryl groups, a phenyl group is particularly used because an image with further improved imbalance tends to be formed.

$R_{47}$ preferably represents a phenyl group or a tert-butyl group and particularly preferably represents a tert-butyl group because an image with further improved imbalance is formed.

In the general formula (14), the alkyl group represented by $R_{48}$ may be any alkyl group. The alkyl group may be, for example, a linear or branched primary to tertiary alkyl group having 1 to 8 carbon atoms (e.g., the number of carbon atoms on a main chain is 1 to 4). Examples of the alkyl group include a methyl group, an ethyl group, a n-propyl group, an iso-propyl group, a n-butyl group, an iso-butyl group, a 2-methylbutyl group, and a 2,3,3-trimethylbutyl group. A methyl group is particularly used because an image with further improved imbalance is formed.

In the general formula (14), the aryl group that optionally has a substituent and is represented by $R_{48}$ is not particularly limited. Examples of the substituent include alkyl groups such as a methyl group and alkoxy groups such as a methoxy group. The total number of carbon atoms of the aryl group (including the number of carbon atoms of the substituent) may be, for example, 6 to 8. Examples of the substituent of the aryl group include a methyl group and a methoxy group. Examples of the aryl group that optionally has a substituent include a phenyl group, a tolyl group (2-methylphenyl group, 3-methylphenyl group, or 4-methylphenyl group), a 4-methoxyphenyl group, and a xylyl group (e.g., 3,5-dimethylphenyl group). Of these aryl groups, a phenyl group is particularly used because an image with further improved imbalance tends to be formed.

In the general formula (14), the alkyl group represented by $R_{49}$ is not particularly limited, and may be a linear or branched primary to tertiary alkyl group having 1 to 8 carbon atoms. Examples of the alkyl group include a methyl group, an ethyl group, a n-propyl group, an iso-propyl group, a n-butyl group, and an iso-butyl group. A methyl group is particularly used because an image with further improved imbalance is formed.

In the general formula (14), the aryl group that optionally has a substituent and is represented by $R_{49}$ may be any substituted or unsubstituted aryl group. Examples of the substituent include alkyl groups such as a methyl group and alkoxy groups such as a methoxy group. The total number of carbon atoms of the aryl group (including the number of carbon atoms of the substituent) may be, for example, 6 to 12. Examples of the aryl group that optionally has a substituent include a phenyl group and a naphthyl group. Of these aryl groups, a phenyl group is particularly used because an image with further improved imbalance tends to be formed.

In the general formula (14), when $R_{49}$ represents —N(—$R_{50}$)$R_{51}$, the alkyl group represented by $R_{50}$ and $R_{51}$ may be any alkyl group. The alkyl group may be, for example, the same alkyl group as that described regarding $R_{19}$ and $R_{20}$ in the general formula (6). Of these alkyl groups, a methyl group is particularly used because an image with further improved imbalance tends to be formed.

In the general formula (14), when $R_{49}$ represents —N(—$R_{50}$)$R_{51}$, the aryl group represented by $R_{50}$ and $R_{51}$ may be any aryl group. Examples of the aryl group include a phenyl group and a naphthyl group. Of these aryl groups, a phenyl group is particularly used because an image with further improved imbalance tends to be formed.

In the general formula (14), when $R_{49}$ represents —N(—$R_{50}$)$R_{51}$, the acyl group represented by $R_{50}$ and $R_{51}$ may be any acyl group. The acyl group is, for example, an unsubstituted alkylcarbonyl group having 2 to 30 carbon atoms, a substituted or unsubstituted arylcarbonyl group having 7 to 30 carbon atoms, or —C(=O)-A (A represents a heterocycle). Specific examples of the acyl group include an acetyl group, a propionyl group, a pivaloyl group, a benzoyl group, and a naphthoyl group. Examples of —C(=O)-A include a 2-pyridylcarbonyl group and a 2-furylcarbonyl group. The substituent of the arylcarbonyl group may be, for example, an alkyl group having 1 to 4 carbon atoms or an alkoxy group having 1 to 4 carbon atoms.

In the general formula (14), when $R_{49}$ represents —N(—$R_{50}$)$R_{51}$, the cyclic structure formed by bonding $R_{50}$ and $R_{51}$ to each other is not particularly limited, and may be a piperidine ring, a piperazine ring, or a morpholine ring.

In particular, at least one of $R_{50}$ and $R_{51}$ is preferably an alkyl group to achieve better imbalance and more preferably a methyl group because an image with further improved imbalance is formed.

Non-limiting examples of the compound represented by the general formula (14) include compounds (111) to (121) below.

-continued
Compound (111)
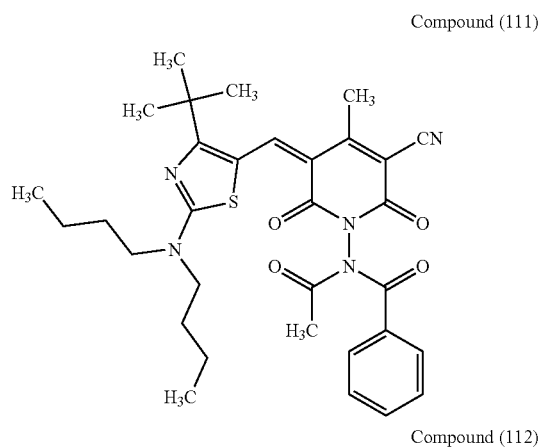
Compound (112)
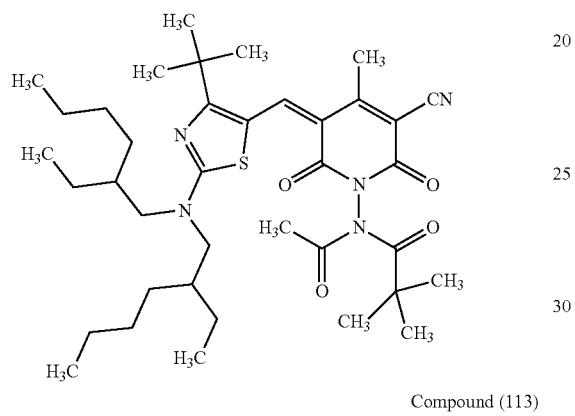
Compound (113)
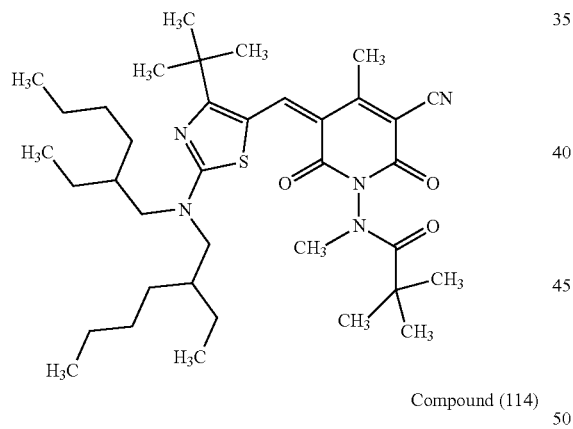
Compound (114)
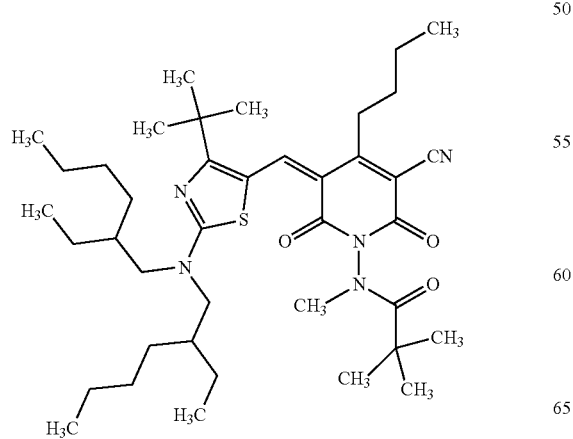
Compound (115)
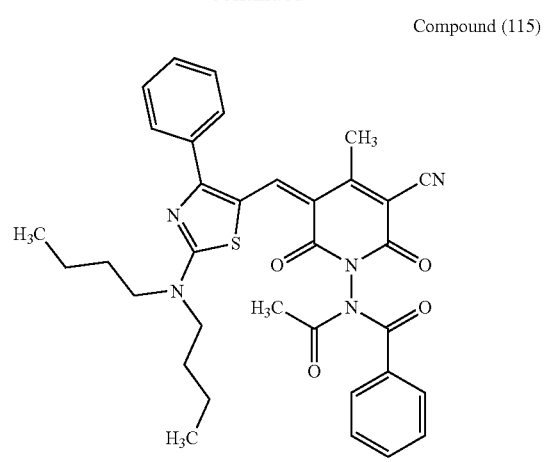
Compound (116)
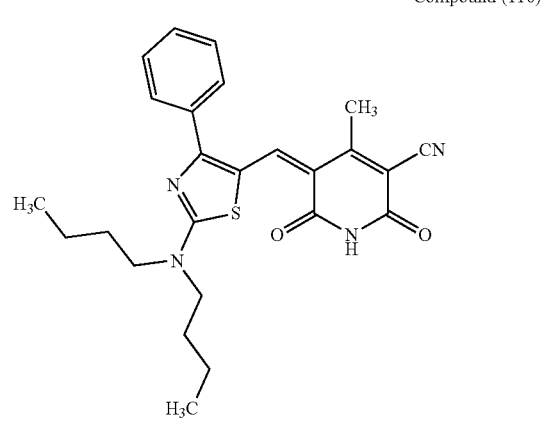
Compound (117)
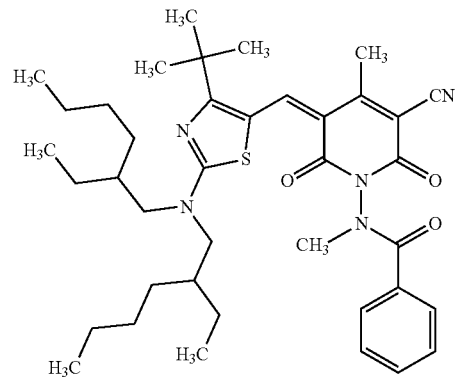

-continued

Compound (118)

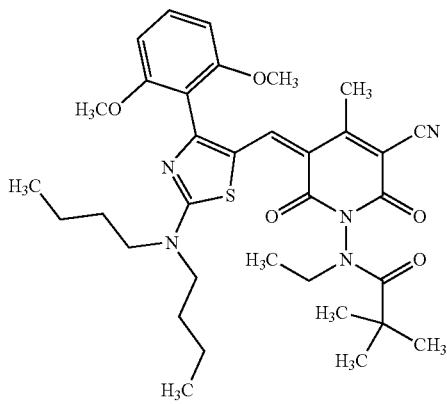

Compound (119)

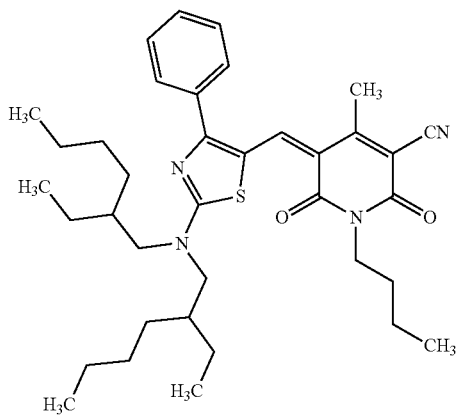

Compound (120)

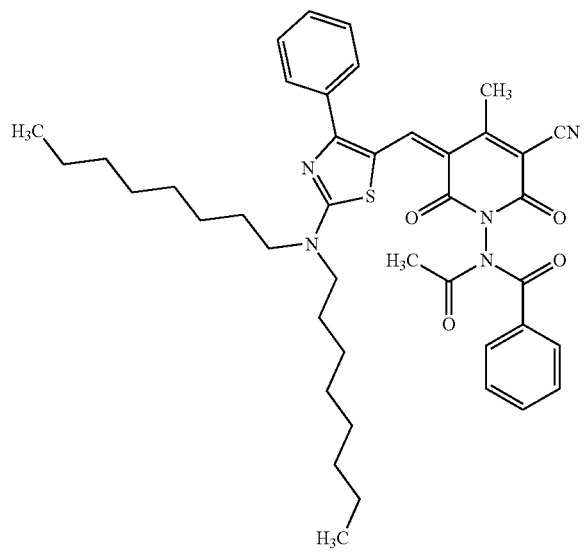

Compound (121)

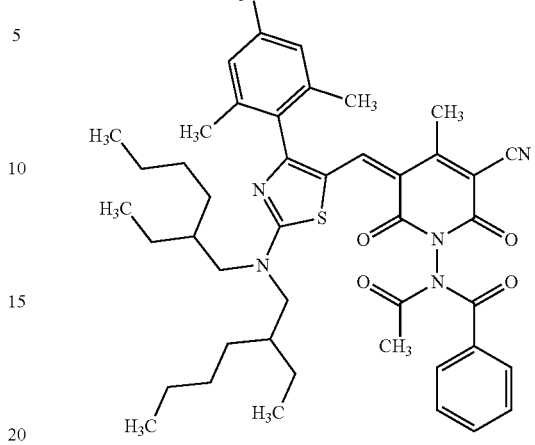

Of these compounds, the compounds (111) to (113) and (117) are particularly used because an image with further improved imbalance is formed.

In addition to the compounds represented by the general formulae (10) to (14), known magenta dyes may also be used in combination.

Thermal Transfer Image-Receiving Sheet (Image-Receiving Sheet)

The image-receiving sheet will be described in detail. The image-receiving sheet includes at least one image-receiving layer on a substrate, and the image-receiving layer contains at least one of the compounds represented by the general formula (1) or the general formula (2).

At least one intermediate layer (e.g., heat insulating layer (porous layer)) can be disposed between the substrate and the image-receiving layer. Furthermore, for example, a gloss controlling layer, a white background adjusting layer, a hiding power improving layer, a solvent resistance improving layer, a charge controlling layer, an adhesive layer, and a primer layer may be included as an intermediate layer other than the heat insulating layer. In addition, a curl adjusting layer, a writing layer, and a charge controlling layer may be formed on the back surface of the substrate of the image-receiving sheet.

Each of the layers can be formed by performing coating or pasting. The coating method is not particularly limited, and a publicly known method such as roll coating, bar coating, gravure coating, micro-gravure reverse coating, curtain coating, slide hopper coating, or die coating can be employed.

Substrate for Image-Receiving Sheet

The substrate used for image-receiving sheets is not particularly limited. The substrate may be, for example, a polyester film such as a polyethylene terephthalate film, a polyolefin film such as a polypropylene film or a polyethylene film, a synthetic resin film such as a polyvinyl chloride film, a polycarbonate film, a polystyrene film, or a polyamide film, wood-free paper, coated paper, resin-coated paper (obtained by laminating both surfaces of an inner paper sheet mainly made of Laubholz pulp with polyethylene, polypropylene, or the like) serving as photo base paper, art paper, cast coated paper, resin laminated paper, or synthesized paper (trade name: YUPO FPG available from YUPO Corporation). These substrates may be used alone or in combination as a complex.

The substrate desirably has a thickness of 50 to 300 μm from the viewpoint of the ease of conveyance in a printer and the strength of printed matter.

Heat Insulating Layer

A heat insulating layer can be disposed on the substrate of the image-receiving sheet to increase the thermal efficiency during printing and improve the printing density.

The heat insulating layer is not particularly limited, and may be, for example, a polyester film (e.g., trade name: Crisper available from TOYOBO Co., Ltd.) such as a polyethylene terephthalate film, or a biaxially stretched film (e.g., trade name: Toyopearl available from TOYOBO Co., Ltd. and YUPO FPG available from YUPO Corporation) including voids (openings) and mainly made of a polyolefin film such as a polypropylene film or a polyethylene film and a filler such as calcium carbonate, titanium oxide, or the like.

Alternatively, a heat insulating layer having a void structure may be formed on the substrate. The method for forming a heat insulating layer is not particularly limited. For example, hollow particles such as microcapsules (may contain a foaming solvent) are subjected to coating together with a binder and heat drying to form a void layer.

Intermediate Layer Other Than Heat Insulating Layer

As described above, the image-receiving sheet may include, as an intermediate layer other than the heat insulating layer, for example, a gloss controlling layer, a white background adjusting layer, a hiding power improving layer, a solvent resistance improving layer, a charge controlling layer, an adhesive layer, and a primer layer. The intermediate layer may have a multilayer structure.

Image-Receiving Layer

The image-receiving layer of the image-receiving sheet according to an embodiment of the present disclosure has a function of receiving a dye that migrates from the ink sheet by sublimation or thermal diffusion to form an image.

The image-receiving layer contains at least one of the compounds represented by the general formula (1) or the general formula (2). For example, the image-receiving layer can be formed by dissolving or dispersing, in an organic solvent, the compound represented by the general formula (1) or the general formula (2) and a resin containing a necessary release agent described later and then performing coating and drying.

When an aqueous latex, an aqueous emulsion resin, or a water-soluble resin is used, the image-receiving layer can be formed by dispersing, in water, the compound represented by the general formula (1) or the general formula (2) and the resin and then performing coating and drying.

When the image-receiving layer is formed using the compound represented by the general formula (1) or the general formula (2), the solvent can be appropriately selected in accordance with the characteristics of the image-receiving layer. Any solvent such as water, an organic solvent, or a mixture of water and the organic solvent may be used.

For example, in the case where the compound represented by the general formula (1) or the general formula (2) and used for the image-receiving sheet is dispersed or dissolved in an aqueous coating liquid for forming the image-receiving layer, protic and aprotic polar organic solvents can be used in a combined manner. For example, when at least one of $R_1$ to $R_8$ or $R'_1$ to $R'_8$ of the compound represented by the general formula (1) or the general formula (2) is an alkoxy group such as a methoxyethyl group or an ethoxyethyl group, a relatively high solubility can be achieved.

On the other hand, in the case where a coating liquid for forming the image-receiving layer is dissolved in an organic solvent or used in a dispersed state, any of the compounds can be used.

Non-limiting examples of the organic solvent include alcohols such as methanol, ethanol, isopropanol, and diacetone alcohol; ketones such as acetone, methyl ethyl ketone, and cyclohexanone; amides such as N,N-dimethylformamide and N,N-dimethylacetamide; sulfoxides such as dimethylsulfoxide; ethers such as tetrahydrofuran, dioxane, and ethylene glycol monomethyl ether; esters such as methyl acetate, ethyl acetate, and butyl acetate; halogenated aliphatic hydrocarbons such as chloroform, methylene chloride, and dichloroethylene; aromatic hydrocarbons such as benzene, toluene, xylene, monochlorobenzene, and dichlorobenzene; aliphatic hydrocarbons such as n-hexane, cyclohexanone, and ligroin; and fluorine-based solvents such as tetrafluoropropanol and pentafluoropropanol.

The content of the compound represented by the general formula (1) or the general formula (2) and used for the image-receiving layer of the image-receiving sheet is preferably 0.1 to 500 mmol/m$^2$, more preferably 0.2 to 100 mmol/m$^2$, and further preferably 0.4 to 50 mmol/m$^2$. When the content is within the above range, an image with further improved imbalance is formed.

The binder resin that can be used for the image-receiving layer is not particularly limited. Examples of the binder resin include halogenated polymers such as polyvinyl chloride and polyvinylidene chloride; vinyl resins such as polyvinyl acetate, ethylene-vinyl acetate copolymers, and vinyl chloride-vinyl acetate copolymers; acrylic resins such as polyacrylic esters; polyolefin resins such as polypropylene; acetal resins such as polyvinyl formal, polyvinyl butyral, and polyvinyl acetal; saturated or unsaturated polyester resins; polycarbonate resins; cellulose resins such as cellulose acetate; styrene resins such as polystyrene, acrylic-styrene copolymers, and acrylonitrile-styrene copolymers; urea resins; melamine resins; and polyamide resins. These resins may be freely mixed with each other so long as they are compatible.

Alternatively, a water-soluble resin or an aqueous dispersion resin may also be used as the binder resin. Non-limiting examples of the water-soluble resin include polyvinyl alcohol, polyvinylpyrrolidone, and gelatin. Examples of the aqueous dispersion resin include vinyl chloride resins, acrylic resins, and urethane resins in the form of emulsion or dispersion.

The resin for the image-receiving layer sometimes causes thermal fusion with the binder resin of the ink sheet during thermal transfer in image formation. Therefore, a release agent may be added to the resin. To achieve good releasability, a release agent such as a silicone compound, a silicone oil, a silicone resin, a phosphoric ester, a surfactant, a fluorine-based compound, or a fluorine-based resin is desirably added to the image-receiving layer. In particular, a resin containing a modified silicone oil can be cured.

At least one release agent is used. The dry coating amount of the release agent is about 0.001 to 1 g/m$^2$. If the dry coating amount is outside the range, fusion between the ink sheet and the image-receiving layer of the image-receiving sheet may occur or the printing sensitivity may deteriorate. As a result of the addition of the release agent to the image-receiving layer, the release agent bleeds to the surface and a release layer is formed. Such a release agent may be applied onto the image-receiving layer without being added to the resin of the image-receiving layer.

Furthermore, for example, a surfactant and an antifoaming agent may also be used in a combined manner for achieving good dispersion and leveling. To improve the whiteness of the image-receiving layer, for example, a white pigment and a fluorescent brightening agent may also be added.

The image-receiving layer may have any thickness, but can have a thickness of 0.2 to 20 g/m² in a dry state. Thermal transfer recording ink sheet (ink sheet)

Next, an ink sheet will be described in detail. The ink sheet includes a coloring material layer containing at least one yellow dye selected from the group consisting of the compounds represented by the general formulae (3) to (6), a coloring material layer containing a magenta dye, and a coloring material layer containing at least one cyan dye selected from the group consisting of the compounds represented by the general formulae (7) to (9), the coloring material layers being disposed on a substrate.

The ink sheet may be produced by any method, but is produced by, for example, the following method.

A coloring material of a color corresponding to an intended coloring material layer, the coloring material being represented by one of the general formulae (3) to (14), a binder resin, an optional surfactant, and an optional wax are gradually added to and sufficiently blended with a medium under stirring. Furthermore, the resulting composition is dissolved or finely dispersed in a stable manner by applying a mechanical shearing force using a dispersing apparatus to prepare an ink. The ink is applied onto a base film serving as the substrate and dried to form a coloring material layer.

The dispersing apparatus used in the above dispersion process is not particularly limited. Examples of the dispersing apparatus include rotary-shear homogenizers, media-type dispersing apparatuses such as ball mills, sand mills, and attritors, and high-pressure counter collision-type dispersing apparatuses.

In addition, for example, a transfer protective layer and a heat-resistant lubricating layer described later may be optionally formed.

Coloring Material Layer

In the coloring material layers, at least one compound selected from the group consisting of the compounds represented by the general formulae (3) to (6) is contained as a yellow dye, and at least one compound selected from the group consisting of the compounds represented by the general formulae (7) to (9) is contained as a cyan dye. Furthermore, at least one compound selected from the group consisting of the compounds represented by the general formulae (10) to (14) can be contained as a magenta dye.

Any dye that is publicly known for thermal transfer and migrates through heat may be used together with the above compounds in consideration of, for example, hue, printing sensitivity, light resistance, storage stability, and solubility in a binder.

The amount of the coloring material of each color used in the present disclosure is preferably 1 to 200 parts by mass based on 100 parts by mass of the binder resin and more preferably 50 to 180 parts by mass from the viewpoint of dispersion of the coloring agent. When two or more dyes are used in combination, the amount corresponds to parts by mass of the total amount of the dyes.

Binder Resin

Various resins can be used as the binder resin for the coloring material layers. Examples of the binder resin include water-soluble resins such as a cellulose resin, a polyacrylic acid resin, a starch resin, and an epoxy resin; and resins soluble in an organic solvent, such as a polyacrylate resin, a polymethacrylate resin, a polystyrene resin, a polycarbonate resin, a polyethersulfone resin, a polyvinyl butyral resin, an ethyl cellulose resin, an acetylcellulose resin, a polyester resin, an AS resin, and a phenoxy resin. These resins may be used alone or may be optionally used in combination of two or more.

Surfactant

The coloring material layers may contain a surfactant so as to exhibit sufficient lubricity during heating of a thermal head (during printing). The surfactant that can be added is, for example, a cationic surfactant, an anionic surfactant, or a nonionic surfactant.

Examples of the cationic surfactant include dodecylammonium chloride, dodecylammonium bromide, dodecyltrimethylammonium bromide, dodecylpyridinium chloride, dodecylpyridinium bromide, and hexadecyltrimethylammonium bromide.

Examples of the anionic surfactant include fatty acid soaps such as sodium stearate and sodium dodecanoate, sodium dodecyl sulfate, sodium dodecylbenzenesulfonate, and sodium lauryl sulfate.

Examples of the nonionic surfactant include dodecyl polyoxyethylene ether, hexadecyl polyoxyethylene ether, nonylphenyl polyoxyethylene ether, lauryl polyoxyethylene ether, sorbitan monooleate polyoxyethylene ether, and monodecanoyl sucrose.

Wax

The coloring material layers may contain a wax so as to exhibit sufficient lubricity when a thermal head is not heated. Non-limiting examples of the wax that can be added include polyethylene wax, paraffin wax, and fatty acid ester waxes.

In addition to the above additives, the coloring material layers may optionally contain an ultraviolet absorber, a preservative, an antioxidant, an antistatic agent, and a viscosity modifier.

Medium Used when Coloring Material Layer is Formed

Non-limiting examples of the medium that can be used when the coloring material layer is formed include water and organic solvents. Examples of the organic solvent include alcohols such as methanol, ethanol, isopropanol, and isobutanol; cellosolves such as methyl cellosolve and ethyl cellosolve; aromatic hydrocarbons such as toluene, xylene, and chlorobenzene; esters such as ethyl acetate and butyl acetate; ketones such as acetone, methyl ethyl ketone, methyl isobutyl ketone, and cyclohexanone; halogenated hydrocarbons such as methylene chloride, chloroform, and trichloroethylene; ethers such as tetrahydrofuran and dioxane; and N,N-dimethylformamide and N-methylpyrrolidone. These organic solvents may be used alone or may be optionally used in combination of two or more.

Substrate and Other Layers

The substrate for the ink sheet is configured to support the above-described coloring material layer and may be a publicly known substrate. Any publicly known substrate having heat resistance and strength to some degree may be used. Examples of the substrate include a polyethylene terephthalate film, a polyethylene naphthalate film, a polycarbonate film, a polyimide film, a polyamide film, an aramid film, a polystyrene film, a 1,4-polycyclohexylenedimethylene terephthalate film, a polysulfone film, a polypropylene film, a polyphenylene sulfide film, a polyvinyl alcohol film, cellophane, a cellulose derivative, a polyethylene film, a polyvinyl chloride film, a nylon film, condenser paper, and paraffin paper. A polyethylene terephthalate film is particularly used from the viewpoint of mechanical strength, solvent resistance, and cost effectiveness.

The substrate has a thickness of 0.5 to 50 μm and preferably has a thickness of 3 to 10 μm from the viewpoint of transferability.

When an ink containing a dye is applied onto the substrate to form a coloring material layer, the wettability, adhesiveness, and the like of a coating liquid tend to be insufficient. Therefore, the substrate may be optionally subjected to treatment for adhesion on one surface or both surfaces thereof.

Non-limiting examples of the treatment for adhesion include ozone treatment, corona discharge treatment, ultraviolet treatment, plasma treatment, low-temperature plasma treatment, primer treatment, and chemical treatment. These treatments may be performed in combination of two or more.

To increase the adhesiveness between the substrate and the coloring material layer, an adhesive layer may be formed on the substrate.

Non-limiting examples of the adhesive layer include organic materials such as a polyester resin, a polystyrene resin, a polyacrylic ester resin, a polyamide resin, a polyether resin, a polyvinyl acetate resin, a polyethylene resin, a polypropylene resin, a polyvinyl chloride resin, a polyvinyl alcohol resin, and a polyvinyl butyral resin; and inorganic fine particles such as silica particles, alumina particles, magnesium carbonate particles, magnesium oxide particles, and titanium oxide particles.

The above material can be applied onto the substrate by any method such as a method that uses a bar coater, a gravure coater, a reverse roll coater, a rod coater, or an air doctor coater. A gravure coater is particularly used.

In the drying process of the resulting coating film, it is sufficient that the coating film is dried at 50° C. to 120° C. for about 1 second to 5 minutes. However, the drying temperature and the drying time are not particularly limited. If the drying is insufficiently performed, scumming may occur. Furthermore, the dye ink may cause setoff when the thermal transfer recording sheet is wound, and the transferred dye ink is again transferred to another dye layer having a different hue when the thermal transfer recording sheet is rewound.

From the viewpoint of transferability, the amount of the ink composition applied is particularly controlled so that the dry thickness of the coloring material layer is in the range of 0.1 to 5 μm.

A publicly known black dye layer may be added to the ink sheet that includes at least a yellow coloring material layer, a magenta coloring material layer, and a cyan coloring material layer. The structure of the ink sheet is not particularly limited, but the coloring material layers are formed on the substrate in a frame sequential manner. For example, a yellow dye layer, a magenta dye layer, and a cyan dye layer are formed repeatedly on the substrate sheet in a direction in which the substrate sheet is transported. When this ink sheet is used, a yellow image, a magenta image, and a cyan image are sequentially formed in this order to form one full-color image. This sequential image formation is repeatedly performed. In addition to the plurality of coloring material layers, a thermally melting black layer may be formed.

In the ink sheet, a transfer protective layer that protects the surface of an image to be formed may be formed in a frame sequential manner with the above-described coloring material layers.

To improve the heat resistance and the mobility of a thermal head, the ink sheet can include a heat-resistant lubricating layer on a side of the substrate opposite to the side on which the coloring material layer is formed. The heat-resistant lubricating layer is formed of a heat-resistant resin. Non-limiting examples of the heat-resistant resin include a polyvinyl butyral resin, a polyvinyl acetal resin, a polyester resin, a polyether resin, a polybutadiene resin, a vinyl chloride-vinyl acetate copolymer resin, a styrene-butadiene copolymer resin, polyurethane acrylate, polyester acrylate, a polyimide resin, and a polycarbonate resin.

The heat-resistant lubricating layer may also contain a crosslinking agent, a release agent, a lubricant, and a lubricity-imparting agent. The lubricant is, for example, an amino-modified silicone compound or a carboxy-modified silicone compound. The lubricity-imparting agent is, for example, heat-resistance fine particles such as silica fine particles.

The heat-resistant lubricating layer is formed by coating the substrate with a heat-resistant lubricating layer coating liquid prepared by dissolving or dispersing the above-described resin and additives in a solvent. The heat-resistant lubricating layer coating liquid is applied by any method such as a method that uses a bar coater, a gravure coater, a reverse roll coater, a rod coater, or an air doctor coater. A gravure coater is particularly used. From the viewpoint of transferability, the amount of the heat-resistant lubricating layer coating liquid applied is controlled so that the dry thickness of the heat-resistant lubricating layer is in the range of 0.1 to 5 μm.

Image Formation

The thermal transfer recording sheet set according to an embodiment of the present disclosure is applicable to an image forming method/image forming apparatus in which by heating the ink sheet with a heating unit while the ink sheet and the image-receiving sheet are placed on top of each other, a coloring material of the ink sheet is transferred onto the image-receiving sheet to form an image.

The heating unit used for the ink sheet is not particularly limited. Instead of a typical method that uses a thermal head, infrared rays or laser beams may also be employed. The ink sheet may also be used as an electric dye-transfer sheet by using an electric heat-generating film that generates heat when an electric current is caused to flow through the base film of the substrate.

EXAMPLE

Hereafter, the present disclosure will be further described in detail based on Examples and Comparative Examples, but is not limited to Examples. In the following description, "parts" refer to "parts by mass" unless otherwise specified.

"CSF" stands for Canadian Standard Freeness. The color of an image sample was measured with a reflection densitometer SpectroLino (manufactured by Gretag Macbeth).

Production of compound having structure represented by general formula (1) or (2)

A compound according to an embodiment of the present disclosure having a structure represented by the general formula (1) or (2) can be synthesized by a publicly known method.

Production of image-receiving sheet
Production of supports (1) and (2)
Production of resin-coated paper First, a paper stock having the following composition was prepared.

Pulp slurry: 100 parts
  Laubholz bleached kraft pulp (LBKP) having a freeness of 450 ml CSF: 80 parts
  Nadelholz bleached kraft pulp (NBKP) having a freeness of 480 ml CSF: 20 parts Cationized starch: 0.60 parts
Heavy calcium carbonate: 10.0 parts
Light calcium carbonate: 15.0 parts
Alkyl ketene dimer: 0.10 parts
Cationic polyacrylamide: 0.03 parts The prepared paper stock was then subjected to paper making with a Fourdrinier paper machine and three-stage wet pressing, followed by drying with a multi-cylinder dryer. The resulting paper was then impregnated with an aqueous solution of oxidized starch using a size press machine so as to have a solid content of 1.0 g/m² and then dried. Furthermore, the paper was subjected to machine calender finishing, thus preparing a base paper A having a basis weight of 140 g/m². A resin composition containing low-density polyethylene (70 parts), high-density polyethylene (20 parts), and titanium oxide (10 parts) was applied onto the base paper A using a die in an amount of 15 g/m². Furthermore, a resin composition containing high-density polyethylene (50 parts) and low-density polyethylene (50 parts) was applied onto the back surface of the base paper A using a die in an amount of 15 g/m² to produce a resin-coated substrate (resin-coated paper) having a basis weight of 170 g/m².

Production of Support (1)

The front surface of the produced substrate was subjected to corona discharge treatment. A porous polyester film (trade name: Crisper R #2311 38 µm, manufactured by TOYOBO Co., Ltd.) serving as a heat insulating layer was pasted on the substrate using 2 g/m² of a urethane adhesive (trade name: TAKELAC/TAKENATE A-969V/A-5, manufactured by Mitsui Chemicals, Inc.) to produce a support (1).

Production of Support (2)

A heat insulating layer-forming coating liquid having the following composition was applied onto the front surface of the produced substrate so that the dry coating amount was 10 g/m², and dried to form a heat insulating layer. Thus, a support (2) was produced.

Polymethyl methacrylate hollow particles: 20 parts (trade name: Microsphere M201, average particle size 3.5 µm, manufactured by Matsumoto Yushi-Seiyaku Co., Ltd.)
Acrylic latex (trade name: LX407, manufactured by Zeon Corporation): 20 parts
Mixed solvent of IPA and water (mass ratio: IPA/water=3/7): 60 parts Production of Image-Receiving Sheet (S1)
Image-Receiving Layer-Forming Coating Liquid (1)
Vinyl chloride-vinyl acetate copolymer: 100 parts (trade name: Solbin C, vinyl chloride/vinyl acetate=87/13, manufactured by Nissin Chemical Co., Ltd.)
Compound (1) : 1.0 part
Toluene/methyl ethyl ketone=1/1: 500 parts
Amino-modified silicone oil: 0.2 parts (trade name: X22-9409, manufactured by Shin-Etsu Chemical Co., Ltd.)
Epoxy-modified silicone oil: 0.2 parts (trade name: X22-2000, manufactured by Shin-Etsu Chemical Co., Ltd.)

These substances were mixed with each other to prepare an image-receiving layer-forming coating liquid (1).

The image-receiving layer-forming coating liquid (1) was applied onto the upper surface of the heat insulating layer of the support (1) by a gravure coating method so that the dry coating amount was 4.0 g/m², and dried to form an image-receiving layer. Thus, an image-receiving sheet (S1) was produced.

Production of Image-Receiving Sheet (S2)
Image-Receiving Layer-Forming Coating Liquid (2)
Vinyl chloride-acrylic ester copolymer: 185 parts (trade name: VINYBLAN 690, solid content 54%, vinyl chloride/acrylic ester=80/20, manufactured by Nissin Chemical Co., Ltd.)
Compound (15) : 0.6 parts
Epoxy-modified silicone oil: 0.40 parts (trade name: X22-2000, manufactured by Shin-Etsu Chemical Co., Ltd.)
Pure water: 300 parts
THF: 30.0 parts These substances were mixed and dispersed to prepare an image-receiving layer-forming coating liquid (2).

The image-receiving layer-forming coating liquid (2) was applied onto the upper surface of the heat insulating layer of the support (2) by a kiss coating method so that the dry coating amount was 4.0 g/m², and dried to form an image-receiving layer. Thus, an image-receiving sheet (S2) was produced.

Production of Image-Receiving Sheets (S3), (S5), (S7), (S9), (S11), and (S13)

Image-receiving sheets (S3), (S5), (S7), (S9), (S11), and (S13) were produced in the same manner as that of the production of the image-receiving sheet (S1), except that the compound (1) was changed to the compounds (11), (23), (18), (122), (124), and (127), respectively, and the amounts of the compounds added were changed to those listed in Table 1.

Production of Image-Receiving Sheets (S4), (S6), (S8), (S10), (S12), and (S14)

Image-receiving sheets (S4), (S6), (S8), (S10), (S12), and (S14) were produced in the same manner as that of the production method of the image-receiving sheet (S2), except that the compound (15) was changed to the compounds (22), (25), (2), (123), (125), and (131), respectively, and the amounts of the compounds added were changed to those listed in Table 1.

Comparative Compound

The following compounds were used as a comparative compound.

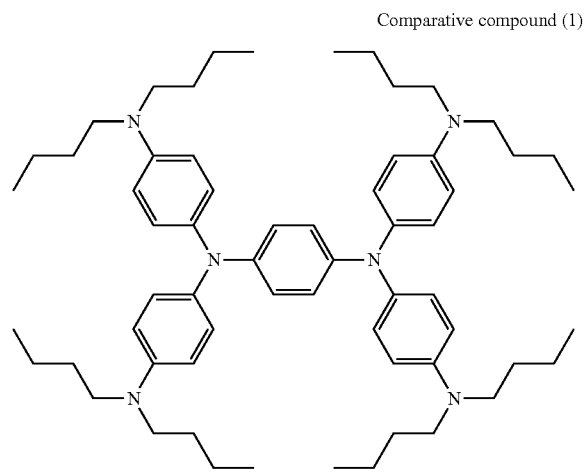

Comparative compound (1)

-continued

Comparative compound (2)

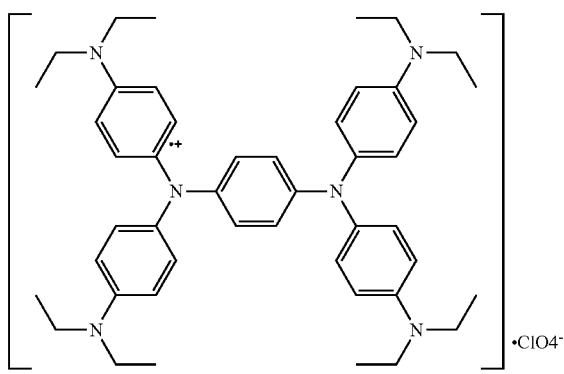

Production of Image-Receiving Sheets (S15) and (S16) for Comparison

Image-receiving sheets (S15) and (S16) for comparison were produced in the same manner as that of the production of the image-receiving sheet (S1), except that the compound (1) was changed to comparative compounds (1) and (2), respectively, and the amounts of the compounds added were changed to those listed in Table 1.

TABLE 1

| Image-receiving sheet | Support | Compound represented by general formula (1) or (2) | Amount of compound added (parts based on 100 parts of resin for image-receiving layer) | Remarks |
|---|---|---|---|---|
| S1 | (1) | Compound (1) | 1.0 | |
| S2 | (2) | Compound (15) | 0.6 | |
| S3 | (1) | Compound (11) | 2.5 | |
| S4 | (2) | Compound (22) | 1.5 | |
| S5 | (1) | Compound (23) | 1.0 | |
| S6 | (2) | Compound (25) | 0.4 | |
| S7 | (1) | Compound (18) | 0.8 | |
| S8 | (2) | Compound (2) | 0.2 | |
| S9 | (1) | Compound (122) | 1.0 | |
| S10 | (2) | Compound (123) | 0.8 | |
| S11 | (1) | Compound (124) | 1.5 | |
| S12 | (2) | Compound (125) | 0.8 | |
| S13 | (1) | Compound (127) | 0.6 | |
| S14 | (2) | Compound (131) | 1.2 | |
| S15 | (1) | Comparative compound (1) | 1.0 | |
| S16 | (1) | Comparative compound (2) | 1.0 | poor solubility |

Production of Ink Sheet

Production of Ink

Yellow Ink Production Example 1

Five parts of a polyvinyl butyral resin (KS-3, manufactured by SEKISUI CHEMICAL Co., Ltd.) were gradually added to and dissolved in a mixed solution of methyl ethyl ketone (45 parts)/toluene (45 parts). To the resulting mixture, 1 part of the compound (32), 2 parts of the compound (38), and 1 part of the compound (55) each serving as a yellow dye were added, and they were completely dissolved to produce a yellow ink (Y1) for producing ink sheets.

Yellow Ink Production Examples 2 and 3

Yellow inks (Y2) and (Y3) were produced in the same manner as in the yellow ink production example 1, except that the yellow dyes and their mixing ratios were changed to the yellow dyes and mixing ratios listed in Table 2. When a plurality of coloring materials were mixed with each other, the total amount of the coloring materials was adjusted to 5 parts.

TABLE 2

| | Yellow dye General formula (3) | Yellow dye General formula (4) | Yellow dye General formula (5) | Yellow dye General formula (6) | Other yellow dyes | Mixing ratio |
|---|---|---|---|---|---|---|
| Y1 | Compound (32) | Compound (42) | — | — | Compound (55) | 1:2:0:0:1 |
| Y2 | Compound (32) | Compound (40) | Compound (46) | — | Compound (55) | 1:2:1:0:1 |
| Y3 | — | Compound (42) | Compound (47) | Compound (52) | Compound (54) | 0:2:1:1:1 |

Cyan Ink Production Examples 1 to 3

Cyan inks (C1) to (C3) were produced in the same manner as in the yellow ink production example 1, except that the cyan dyes and their mixing ratios listed in Table 3 were employed. The total amount of the coloring materials was adjusted to 5 parts.

TABLE 3

| | Cyan dye General formula (7) | Cyan dye General formula (8) | Cyan dye General formula (9) | Mixing ratio |
|---|---|---|---|---|
| C1 | Compound (57) | Compound (65) | — | 3:2:0 |
| C2 | Compound (56) | Compound (65) | Compound (69) | 2:2:1 |
| C3 | Compound (57) | Compound (65) | Compound (70) | 2:2:1 |

Magenta Ink Production Examples 1 to 3

Magenta inks (M1) to (M3) were produced in the same manner as in the yellow ink production example 1, except that the magenta dyes and their mixing ratios listed in Table 4 were employed. The total amount of the coloring materials was adjusted to 5 parts.

TABLE 4

| | Magenta dye General formula (10) | Magenta dye General formula (11) | Magenta dye General formula (12) | Magenta dye General formula (13) | Magenta dye General formula (14) | Mixing ratio |
|---|---|---|---|---|---|---|
| M1 | Compound (75) | Compound (86) | — | — | Compound (111) | 2:2:0:0:1 |
| M2 | Compound (77) | Compound (90) | Compound (96) | — | — | 2:2:1:0:0 |
| M3 | Compound (77) | Compound (86) | — | Compound (104) | Compound (112) | 2:2:0:1:1 |

Production of Ink Sheet (Ink1)

A polyethylene terephthalate film (Lumirror, manufactured by TORAY INDUSTRIES, INC.) having a thickness of 4.5 μm was used as a substrate. The yellow ink (Y1) for producing ink sheets was applied onto the substrate so as to have a dry thickness of 1 μm and dried to form a yellow dye layer.

Subsequently, a magenta dye layer was formed in a region next to the region of the yellow dye layer in the same manner as that of the formation of the yellow dye layer, except that the magenta ink (M1) was used instead of the yellow ink (Y1). Similarly, a cyan dye layer was formed in a region next to the region of the magenta dye layer using the cyan ink (C1). Thus, an ink sheet (Ink1) including a yellow dye layer, a magenta dye layer, and a cyan dye layer serving as coloring material layers was produced.

Production of Ink Sheets (Ink2) to (Ink11)

Ink sheets (Ink2) to (Ink11) each including a yellow dye layer, a magenta dye layer, and a cyan dye layer were produced in the same manner as that of the production of the ink sheet (Ink1), except that the inks used were changed to those listed in Table 5.

Example 1

An image sample (1) was produced with a converted machine of Selphy manufactured by CANON KABUSHIKI KAISHA using the produced image-receiving sheet (S1) and the ink sheet (Ink1). The output was controlled so that the optical density (O.D.) of printed matter was 1.0 for each of yellow, magenta, and cyan. At this output, yellow, magenta, and cyan were superimposed in this order to print a black image, thereby outputting a sample 1.

Examples 2 to 14 and Comparative Examples 1 and 2

Image samples 2 to 14 and comparative image samples 1 and 2 were output in the same manner as in Example 1, except that the combination of the image-receiving sheet and the ink sheet in Example 1 was changed to those listed in Table 5.

TABLE 5

| | Image sample | Ink sheet | Yellow ink | Magenta ink | Cyan ink | Image-receiving sheet |
|---|---|---|---|---|---|---|
| Example 1 | Sample 1 | Ink1 | Y1 | M1 | C1 | S1 |
| Example 2 | Sample 2 | Ink2 | Y2 | M1 | C1 | S2 |
| Example 3 | Sample 3 | Ink3 | Y3 | M2 | C1 | S3 |
| Example 4 | Sample 4 | Ink4 | Y1 | M2 | C2 | S4 |
| Example 5 | Sample 5 | Ink5 | Y2 | M3 | C3 | S5 |
| Example 6 | Sample 6 | Ink6 | Y3 | M3 | C3 | S6 |
| Example 7 | Sample 7 | Ink7 | Y1 | M3 | C3 | S7 |
| Example 8 | Sample 8 | Ink8 | Y2 | M1 | C2 | S8 |
| Example 9 | Sample 9 | Ink9 | Y3 | M1 | C1 | S9 |
| Example 10 | Sample 10 | Ink1 | Y1 | M1 | C1 | S10 |
| Example 11 | Sample 11 | Ink10 | Y2 | M2 | C1 | S11 |
| Example 12 | Sample 12 | Ink11 | Y3 | M2 | C2 | S12 |
| Example 13 | Sample 13 | Ink7 | Y1 | M3 | C3 | S13 |
| Example 14 | Sample 14 | Ink5 | Y2 | M3 | C3 | S14 |
| Comparative Example 1 | Comparative sample 1 | Ink1 | Y1 | M1 | C1 | S15 |
| Comparative Example 2 | Comparative sample 2 | Ink7 | Y1 | M3 | C3 | S16 |

Evaluation

Imbalance Evaluation

The image samples produced in Examples 1 to 14 and Comparative Examples 1 and 2 were subjected to an exposure test for 30 hours using a xenon test chamber (Atlas Ci4000, manufactured by Suga Test Instruments Co., Ltd.) under the conditions of luminous intensity 0.28 W/m$^2$ at 340 nm and temperature 40° C./relative humidity 50%.

When the initial optical density was expressed as $OD_0$ and the optical density after exposure for 30 hours was expressed as $OD_{30}$, the optical density (OD) residual ratio was defined to be as follows.

OD residual ratio=$OD_{30}/OD_0$

Subsequently, the OD residual ratio of each of cyan, magenta, and yellow components in the black image was calculated, and the absolute value of the difference in OD residual ratio was calculated as follows.

$Bk(C-Y)$=100×|(OD residual ratio of yellow component−OD residual ratio of cyan component)|

$Bk(M-Y)$=100×|(OD residual ratio of yellow component−OD residual ratio of magenta component)|

$Bk(C-M)$=100×|(OD residual ratio of cyan component−OD residual ratio of magenta component)|

The absolute value of the difference in OD residual ratio was used as an indicator of "imbalance", and the evaluation of imbalance was performed on the basis of the following criteria. Table 6 shows the evaluation results of imbalance.

A (excellent): imbalance<10
B (good): 10≤imbalance≤15
C (poor): 15<imbalance

TABLE 6

|  |  | Imbalance | | | | | |
|---|---|---|---|---|---|---|---|
|  |  | Bk(C-Y) | | Bk(M-Y) | | Bk(C-M) | |
| Image sample | | Value | Evaluation | Value | Evaluation | Value | Evaluation |
| Example 1 | Sample 1 | 2 | A | 3 | A | 3 | A |
| Example 2 | Sample 2 | 6 | A | 5 | A | 11 | B |
| Example 3 | Sample 3 | 4 | A | 4 | A | 10 | B |
| Example 4 | Sample 4 | 9 | A | 3 | A | 6 | A |
| Example 5 | Sample 5 | 14 | B | 3 | A | 7 | A |
| Example 6 | Sample 6 | 10 | B | 4 | A | 5 | A |
| Example 7 | Sample 7 | 8 | A | 6 | A | 6 | A |
| Example 8 | Sample 8 | 13 | B | 8 | A | 8 | A |
| Example 9 | Sample 9 | 3 | A | 3 | A | 3 | A |
| Example 10 | Sample 10 | 5 | A | 4 | A | 5 | A |
| Example 11 | Sample 11 | 4 | A | 5 | A | 5 | A |
| Example 12 | Sample 12 | 8 | A | 6 | A | 7 | A |
| Example 13 | Sample 13 | 13 | B | 5 | A | 10 | B |
| Example 14 | Sample 14 | 12 | B | 4 | A | 9 | A |
| Comparative Example 1 | Comparative sample 1 | 35 | C | 6 | A | 41 | C |
| Comparative Example 2 | Comparative sample 2 | 25 | C | 6 | A | 33 | C |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-231527 filed Nov. 29, 2016, which is hereby incorporated by reference herein in its entirety.

What is claimed is:

1. A thermal transfer recording sheet set comprising:
an ink sheet; and
an image-receiving sheet,
wherein the image-receiving sheet is a thermal transfer image-receiving sheet including an image-receiving layer containing at least one compound selected from the group consisting of compounds represented by general formulae (1) and (2), the image-receiving layer being disposed on a substrate,
the ink sheet is a thermal transfer recording ink sheet including a coloring material layer containing a yellow dye, a coloring material layer containing a magenta dye, and a coloring material layer containing a cyan dye, the coloring material layers being disposed on a substrate,
the yellow dye contains at least one compound selected from the group consisting of compounds represented by general formulae (3) to (6), and
the cyan dye contains at least one compound selected from the group consisting of compounds represented by general formulae (7) to (9),

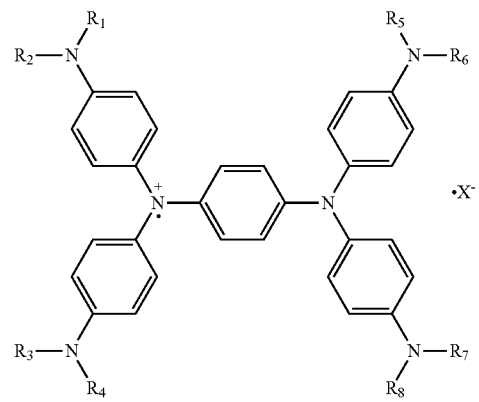

General formula (1)

in the general formula (1), $R_1$ to $R_8$ each independently represent an alkyl group that has 3 to 8 carbon atoms and optionally has a substituent, an alkenyl group that optionally has a substituent, an aralkyl group that optionally has a substituent, an alkynyl group that optionally has a substituent, or an aryl group that optionally has a substituent; $R_1$ and $R_2$, $R_3$ and $R_4$, $R_5$ and $R_6$, and $R_7$ and $R_8$ each optionally bond to each other so as to form a ring; and $X^-$ represents an anion,

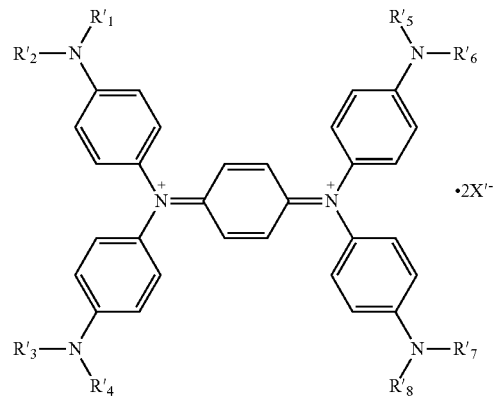

General formula (2)

in the general formula (2), $R'_1$ to $R'_8$ each independently represent an alkyl group that has 3 to 8 carbon atoms and optionally has a substituent, an alkenyl group that optionally has a substituent, an aralkyl group that optionally has a substituent, an alkynyl group that optionally has a substituent, or an aryl group that optionally has a substituent; $R'_1$ and $R'_2$, $R'_3$ and $R'_4$, $R'_5$ and $R'_6$, and $R'_7$ and $R'_8$ each optionally bond to each other so as to form a ring; and $X'^-$ represents an anion,

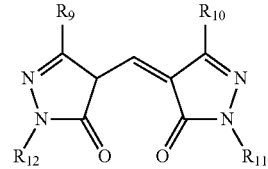

General formula (3)

in the general formula (3), $R_9$ to $R_{12}$ each independently represent an alkyl group or an aryl group that optionally has a substituent, General formula (4)

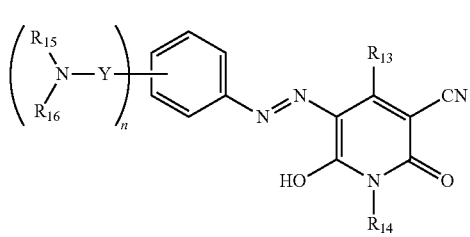

in the general formula (4), $R_{13}$ represents an alkyl group, an aryl group that optionally has a substituent, or an amino group that optionally has a substituent; $R_{14}$ represents a hydrogen atom, an alkyl group, an aryl group that optionally has a substituent, or —N(—$R_a$)$R_b$, where $R_a$ and $R_b$ each independently represent a hydrogen atom, an alkyl group, or an acyl group, and $R_a$ and $R_b$ optionally bond to each other so as to form a ring; $R_{15}$ represents an alkyl group; $R_{16}$ represents a hydrogen atom or an alkyl group; Y represents a carbonyl group or a sulfonyl group; and n represents an integer of 1 to 3, General formula (5)

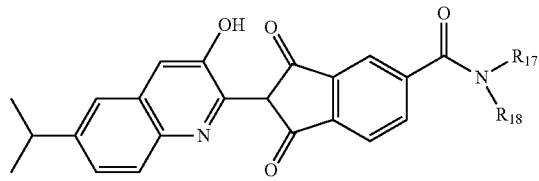

in the general formula (5), $R_{17}$ and $R_{18}$ each independently represent an alkyl group or an aryl group, General formula (6)

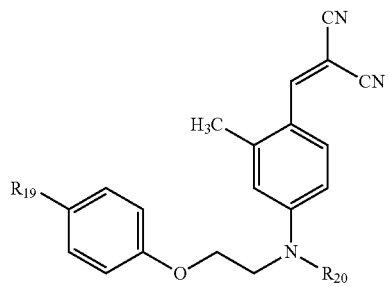

in the general formula (6), $R_{19}$ and $R_{20}$ each independently represent an alkyl group or an aryl group, General formula (7)

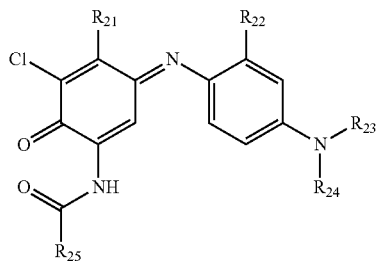

in the general formula (7), $R_{21}$ to $R_{25}$ each independently represent an alkyl group or an aryl group, General formula (8)

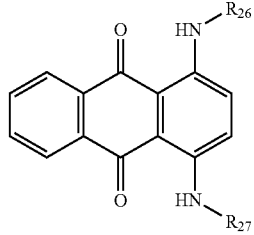

in the general formula (8), $R_{26}$ and $R_{27}$ each independently represent an alkyl group or an aryl group that optionally has a substituent, and General formula (9)

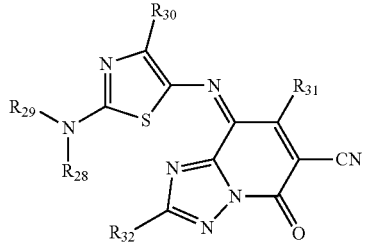

in the general formula (9), $R_{28}$ to $R_{32}$ each independently represent an alkyl group or an aryl group.

2. The thermal transfer recording sheet set according to claim 1,
   wherein the image-receiving layer contains the compound represented by the general formula (1), and
   $R_1$ to $R_8$ in the general formula (1) each independently represent an alkyl group having 3 to 8 carbon atoms.

3. The thermal transfer recording sheet set according to claim 1,
   wherein the image-receiving layer contains the compound represented by the general formula (1), and
   $R_1$ and $R_2$, $R_3$ and $R_4$, $R_5$ and $R_6$, and $R_7$ and $R_8$ in the general formula (1) each represent the same substituent.

4. The thermal transfer recording sheet set according to claim 1,
   wherein the image-receiving layer contains the compound represented by the general formula (2), and
   $R'_1$ to $R'_8$ in the general formula (2) each independently represent an alkyl group having 3 to 8 carbon atoms.

5. The thermal transfer recording sheet set according to claim 1,
wherein the image-receiving layer contains the compound represented by the general formula (2), and
$R'_1$ and $R'_2$, $R'_3$ and $R'_4$, $R'_5$ and $R'_6$, and $R'_7$ and $R'_8$ in the general formula (2) each represent the same substituent.

6. The thermal transfer recording sheet set according to claim 1, wherein the magenta dye contains at least one compound selected from the group consisting of compounds represented by general formulae (10) to (14),

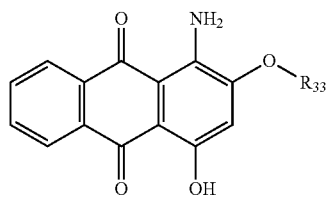

General formula (10)

in the general formula (10), $R_{33}$ represents an alkyl group that optionally contains an ethereal oxygen atom or an aryl group that optionally has a substituent,

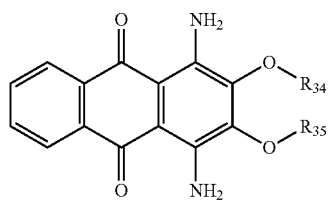

General formula (11)

in the general formula (11), $R_{34}$ and $R_{35}$ each independently represent an alkyl group or an aryl group that optionally has a substituent,

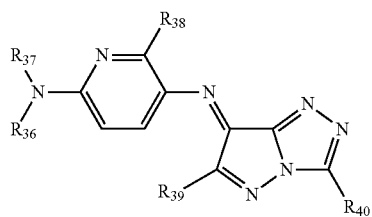

General formula (12)

in the general formula (12), $R_{36}$ to $R_{40}$ each independently represent an alkyl group or an aryl group that optionally has a substituent,

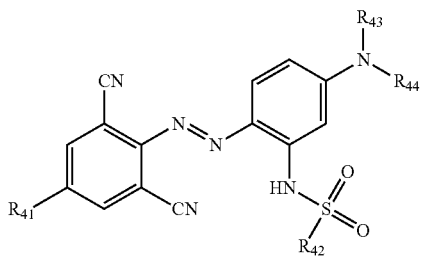

General formula (13)

in the general formula (13), $R_{41}$ to $R_{44}$ each independently represent an alkyl group or an aryl group that optionally has a substituent, and

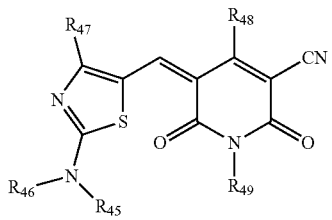

General formula (14)

in the general formula (14), $R_{45}$ and $R_{46}$ each independently represent an alkyl group; $R_{47}$ represents a hydrogen atom, an alkyl group, or an aryl group that optionally has a substituent; $R_{48}$ represents an alkyl group or an aryl group that optionally has a substituent; and $R_{49}$ represents a hydrogen atom, an alkyl group, an aryl group that optionally has a substituent, or —N(—$R_{50}$)$R_{51}$, where $R_{50}$ and $R_{51}$ each independently represent a hydrogen atom, an alkyl group, an aryl group, or an acyl group or $R_{50}$ and $R_{51}$ bond to each other so as to form a cyclic structure.

7. A method for forming an image, comprising:
heating an ink sheet with a heating unit while the ink sheet and an image-receiving sheet are placed on top of each other to transfer a coloring material of the ink sheet to the image-receiving sheet,
wherein the image-receiving sheet is a thermal transfer image-receiving sheet including an image-receiving layer containing at least one compound selected from the group consisting of compounds represented by general formulae (1) and (2), the image-receiving layer being disposed on a substrate,
the ink sheet is a thermal transfer recording ink sheet including a coloring material layer containing a yellow dye, a coloring material layer containing a magenta dye, and a coloring material layer containing a cyan dye, the coloring material layers being disposed on a substrate,
the yellow dye contains at least one compound selected from the group consisting of compounds represented by general formulae (3) to (6), and
the cyan dye contains at least one compound selected from the group consisting of compounds represented by general formulae (7) to (9), General formula (1)

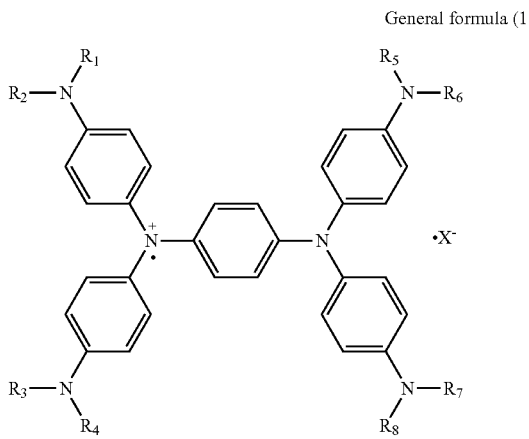

in the general formula (1), $R_1$ to $R_8$ each independently represent an alkyl group that has 3 to 8 carbon atoms and optionally has a substituent, an alkenyl group that optionally has a substituent, an aralkyl group that optionally has a substituent, an alkynyl group that optionally has a substituent, or an aryl group that optionally has a substituent; $R_1$ and $R_2$, $R_3$ and $R_4$, $R_5$ and $R_6$, and $R_7$ and $R_8$ each optionally bond to each other so as to form a ring; and $X^-$ represents an anion, General formula (2)

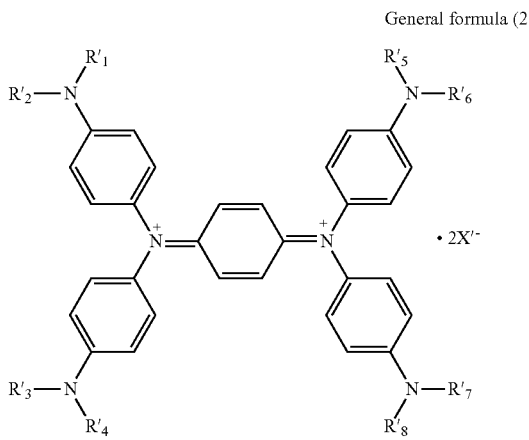

in the general formula (2), $R'_1$ to $R'_8$ each independently represent an alkyl group that has 3 to 8 carbon atoms and optionally has a substituent, an alkenyl group that optionally has a substituent, an aralkyl group that optionally has a substituent, an alkynyl group that optionally has a substituent, or an aryl group that optionally has a substituent; $R'_1$ and $R'_2$, $R'_3$ and $R'_4$, $R'_5$ and $R'_6$, and $R'_7$ and $R'_8$ each optionally bond to each other so as to form a ring; and $X'^-$ represents an anion, General formula (3)

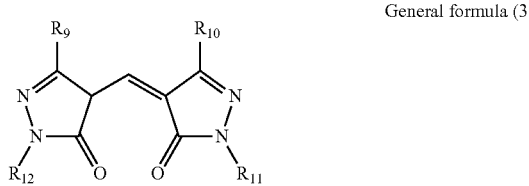

in the general formula (3), $R_9$ to $R_{12}$ each independently represent an alkyl group or an aryl group that optionally has a substituent, General formula (4)

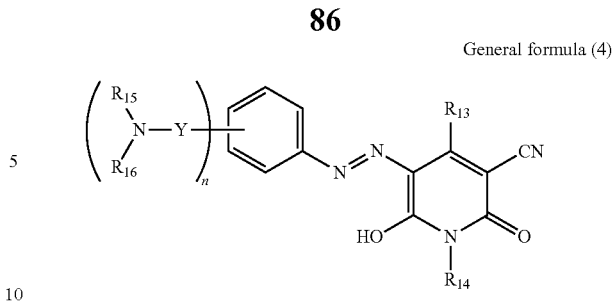

in the general formula (4), $R_{13}$ represents an alkyl group, an aryl group that optionally has a substituent, or an amino group that optionally has a substituent; $R_{14}$ represents a hydrogen atom, an alkyl group, an aryl group that optionally has a substituent, or —N(—$R_a$)$R_b$, where $R_a$ and $R_b$ each independently represent a hydrogen atom, an alkyl group, or an acyl group, and $R_a$ and $R_b$ optionally bond to each other so as to form a ring; $R_{15}$ represents an alkyl group; $R_{16}$ represents a hydrogen atom or an alkyl group; Y represents a carbonyl group or a sulfonyl group; and n represents an integer of 1 to 3, General formula (5)

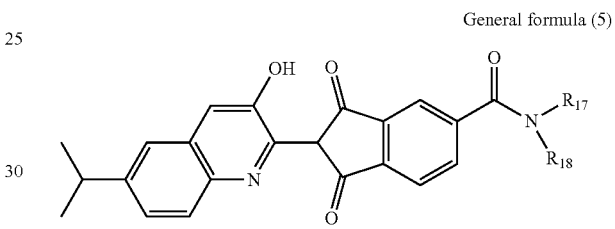

in the general formula (5), $R_{17}$ and $R_{18}$ each independently represent an alkyl group or an aryl group, General formula (6)

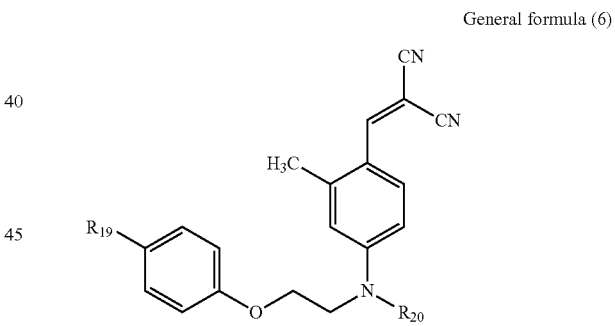

in the general formula (6), $R_{19}$ and $R_{20}$ each independently represent an alkyl group or an aryl group, General formula (7)

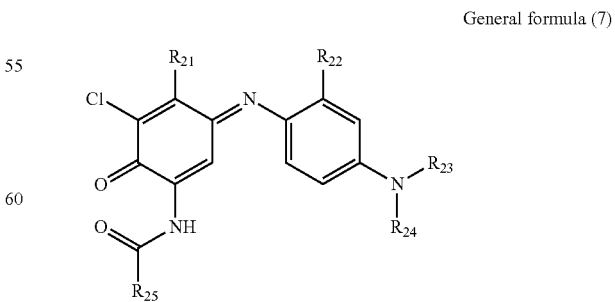

in the general formula (7), $R_{21}$ to $R_{25}$ each independently represent an alkyl group or an aryl group, General formula (8)
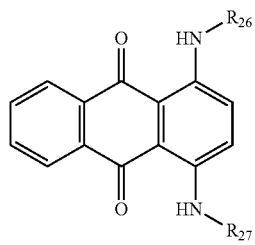
in the general formula (8), $R_{26}$ and $R_{27}$ each independently represent an alkyl group or an aryl group that optionally has a substituent, and
General formula (9)
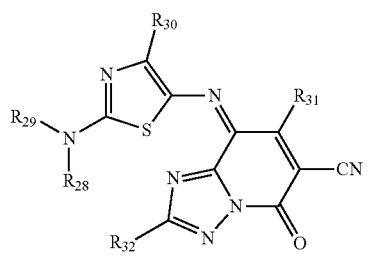
in the general formula (9), $R_{28}$ to $R_{32}$ each independently represent an alkyl group or an aryl group.
* * * * *